United States Patent [19]

Tashiro et al.

[11] Patent Number: 5,537,967
[45] Date of Patent: Jul. 23, 1996

[54] VIBRATION DAMPING CONTROL APPARATUS FOR VEHICLE

[75] Inventors: Hiroshi Tashiro, Nagoya; Hiroyuki Aota; Takaji Murakawa, both of Kariya; Toyoji Yagi, Anjo; Shigenori Isomura, Kariya, all of Japan

[73] Assignee: Nippondenso Co., Ltd., Aichi-Pref, Japan

[21] Appl. No.: 401,508

[22] Filed: Mar. 10, 1995

Related U.S. Application Data

[63] Continuation-in-part of Ser. No. 173,117, Dec. 27, 1993, abandoned.

[30] Foreign Application Priority Data

| Dec. 28, 1992 | [JP] | Japan | 4-348515 |
| Jul. 28, 1993 | [JP] | Japan | 5-186368 |
| Oct. 19, 1993 | [JP] | Japan | 5-260917 |
| Mar. 10, 1994 | [JP] | Japan | 6-039927 |

[51] Int. Cl.$^6$ .................................. F02B 75/06
[52] U.S. Cl. ............................................. 123/192.1
[58] Field of Search ............................ 123/192.1, 192.2; 74/603, 604

[56] References Cited

U.S. PATENT DOCUMENTS

| 4,922,869 | 5/1990 | Kadomukai et al. | 123/192.1 |
| 5,109,815 | 5/1992 | Maeda et al. | 123/192.1 |
| 5,185,543 | 2/1993 | Tebbe | 391/106 |

FOREIGN PATENT DOCUMENTS

| 61-65023 | 4/1986 | Japan. |
| 61-247300 | 11/1986 | Japan. |
| 63-157628 | 6/1988 | Japan. |
| 63-314346 | 12/1988 | Japan. |
| 4252823 | 9/1992 | Japan. |

*Primary Examiner*—Noah P. Kamen
*Attorney, Agent, or Firm*—Cushman Darby & Cushman

[57] ABSTRACT

A vibration damping control system for an automotive vehicle is provided. This system includes a torque generator operating with given operation timing to produce a torque vibration of a preselected frequency and an operation timing controller. The operation timing controller initially determines a phase difference between engine revolution and frequency of vehicle vibration formed of a resultant vector defined by a first vibration component caused by movement of a crankshaft of the engine and a second vibration component caused by movement of a piston of the engine. The controller then modifies the operation timing of the torque generator to provide the torque vibration in an opposite phase relative to the vehicle vibration based on the phase difference determined to compensate the vehicle vibration.

48 Claims, 29 Drawing Sheets

400rpm UNDER NON-CONTROL

A  0.030 ~
B  0.025 ~ 0.030
C  0.020 ~ 0.025
D  0.015 ~ 0.020
E  0.010 ~ 0.015
F  0.005 ~ 0.010
G  ~ 0.005

400rpm UNDER CONTROL

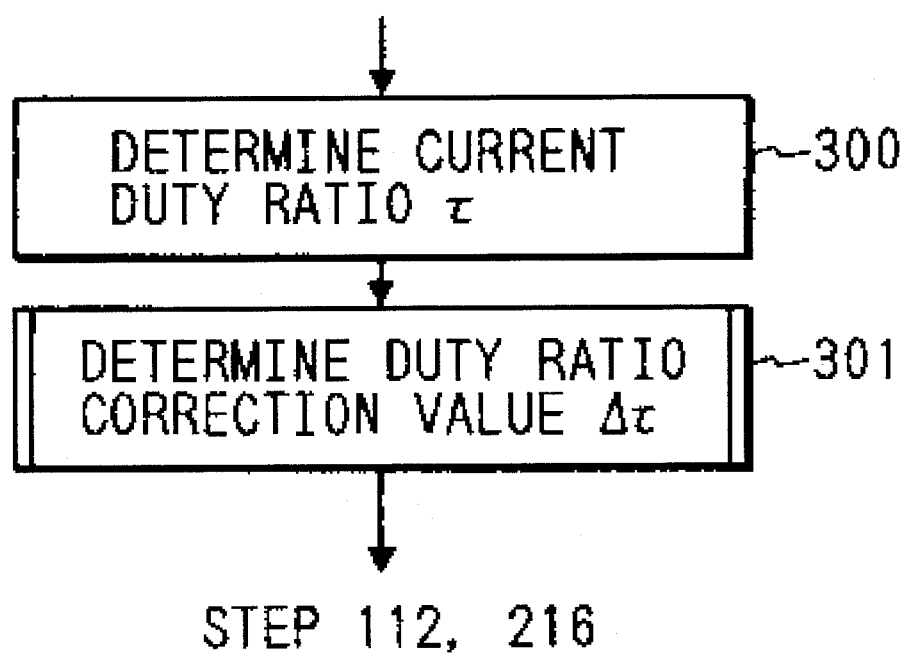

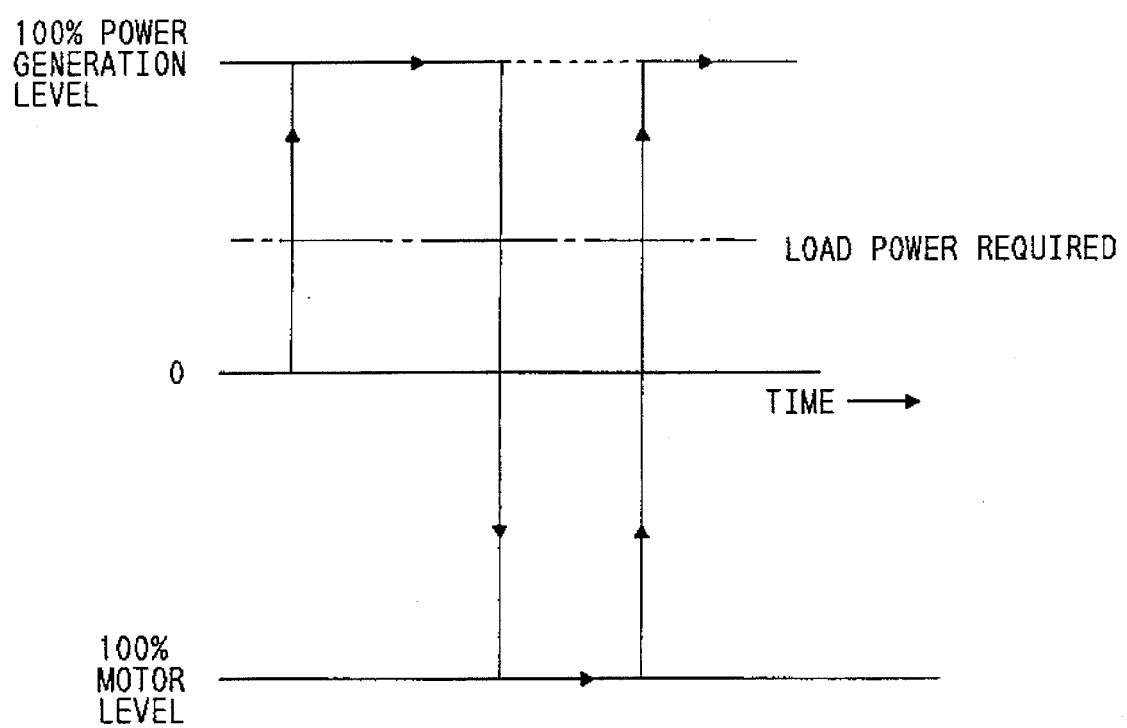

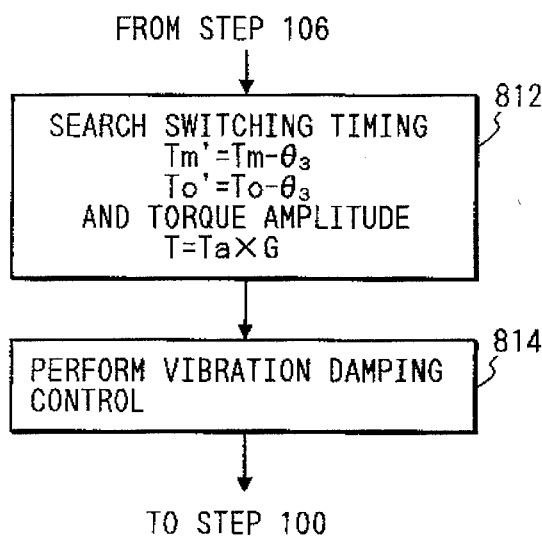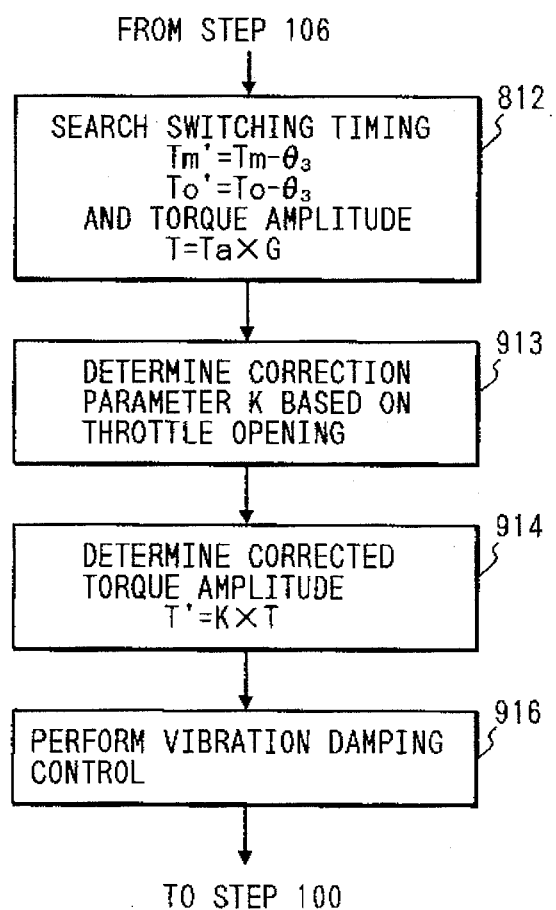
FIG. 34
FIG. 36

VIBRATION DAMPING CONTROL APPARATUS FOR VEHICLE

This is a continuation-in-part of application Ser. No. 08/173,117 filed Dec. 27, 1993 abandoned.

BACKGROUND OF THE INVENTION

1. Technical Field of the Invention

The present invention relates generally to a vibration damping apparatus for automotive vehicles, and more particularly to a vibration damping apparatus operable to minimize vibration transmitted to a vehicle body caused by engine rotation.

2. Background Art

Japanese Patent First Publication No. 61-65023 discloses a vibration control system for reducing torque variation of an internal combustion engine utilizing an electric generator and an electric motor which are arranged respectively to provide additional torque to the engine and consume part of engine torque. This conventional system is designed to detect engine speed to control operation switching timing between the electric generator and the electric motor based thereon. When the engine torque is high, the electric generator provides a reverse torque to eliminate an excess of the engine torque, while, when the engine torque is low, the electric motor provides additional torque to compensate a lack of the engine torque. The operation switching timing between the electric generator and the electric motor are selected according to the detected engine speed based on the fact that the engine is subjected to the variation in combustion torque when the engine speed is high, while the engine undergoes the variation in inertial torque caused by piston movement when the engine speed is low, and the phase of the variation in torque is changed according to the engine speed.

Generally, the vehicle vibrations consist of a rotational vibration component (i.e., a torque variation component) caused by reaction of a small variation in speed of a crankshaft and a vertical vibration component produced by reaction of vertical displacement of a piston. The above prior art torque vibration control system thus, raises a drawback in that although the variation in engine torque, or the rotational vibration component developed by the reaction of the small variation in speed of the crankshaft may be minimized, the vertical vibration component is not reduced.

SUMMARY OF THE INVENTION

It is therefore a principal object of the present invention to avoid the disadvantages of the prior art.

It is another object of the present invention to provide a vibration damping control system for automotive vehicles which is operable to minimize a wide rage of vehicle vibration caused by engine revolution.

According to one aspect of the present invention, there is provided a vibration damping control system for a vehicle which comprises a rotary electric machine connected to an internal combustion engine, a crank angle detecting means for detecting a crank angle of the internal combustion engine, an engine operation condition detecting means for detecting engine operation condition related to a phase difference between the crank angle detected by the crank angle detecting means and a primary frequency component of vehicle vibration including a resultant vector defined by a rotational vibration component and a vertical vibration component, an operation mode determining means for determining an operation mode of the rotary electric machine based on the engine operation condition detected by the engine operation condition detecting means to reduce both the rotational vibration component and the vertical vibration component, and a controlling means for controlling the rotary electric machine based on the operation mode determined by the operation mode determining means.

In the preferred mode of the invention, a torque transmission unit is further provided which connects between the internal combustion engine and the rotary electric machine to establish torque transmission between the engine and the rotary electric machine. A torque transmission delay correction angle determining means is provided for determining a phase delay angle of the torque transmission relative to the crank angle developed. The operation mode determining means determines the operation mode of the rotary electric machine based on the engine operating condition detected by the engine operating condition detecting means, the relationship between the phase difference and the engine operating condition, and the phase delay angle determined by the torque transmission delay correction angle determining The operation mode determining means further determines an amplitude of the torque variation produced by the rotary electric machine so as to compensate for a transfer gain of the torque transmission unit.

The operation mode determining means determines an amplitude of the torque variation to be produced by the rotary electric machine so as to compensate for an amplitude variation of the vehicle vibrations caused by a difference between an opening degree of a throttle valve measured and a reference opening degree of the throttle valve.

According to another aspect of the present invention, there is provided a vibration damping control system for a vehicle which comprises a rotary electric machine connected to an internal combustion engine, a vibration detecting means for detecting a primary frequency component of vehicle vibration including a resultant vector defined by a rotational vibration component and a vertical vibration component, an operation mode determining means for determining an operation mode of the rotary electric machine based on the engine operation condition detected by the engine operation condition detecting means to reduce both the rotational vibration component and the vertical vibration component, and a controlling means for controlling the rotary electric machine based on the operation mode determined by the operation mode determining means.

According to a further aspect of the invention, there is provided a vibration damping control system for a vehicle which comprises a vibration producing means, operating with a given operation timing, for producing a vibration of a preselected frequency, a phase difference determining means for determining a phase difference between engine revolution and frequency of vehicle vibrations including a first vibration component caused by movement of a rotational member of an engine and a second vibration component caused by movement of a rectilinear member of the engine, and a controlling means for controlling the operation timing of the vibration damping means to provide the vibration in a phase defined in a preselected relation to the phase difference determined by the phase difference determining means to compensate the vehicle vibrations.

In the preferred mode, the vibration producing means provides a torque variation having the same frequency as the vehicle vibration in an opposite phase relative to a resultant vector including the first and second vibration components.

A crank angle sensor means may be provided which determines a crank angle of the engine. The phase difference determining means determines the phase difference between a crank angle and the resultant vector including the first and second vibration components.

An engine speed sensor means and a throttle valve position sensor means may be arranged to determine engine speed and to determine an opening degree of a throttle valve, respectively. The phase difference determining means determines the phase difference between the crank angle and the resultant vector including the first and second vibration components based on the engine speed and the opening degree of the throttle valve.

The phase difference determining means determines a phase angle between vibration of the engine and the crank angle at a location of the vibration producing means. The controlling means controls the operation timing of the vibration damping means to provide the vibration in a phase defined in a preselected relation to the phase angle determined by the phase difference determining means.

The phase difference determining means further determines an amplitude of the resultant vector including the first and second vibration components. The controlling means controlling the operation timing of the vibration damping means to provide the vibration in the phase defined in the preselected relation to the phase difference with the amplitude determined by the phase difference determining means.

The phase difference determining means determines a phase difference between the crank angle and the torque variation of the vibration producing means serving to minimize the vehicle vibration generated at a preselected portion of a vehicle body according to engine speed. The phase difference determining means further determines an amplitude of the torque variation of the vibration producing means serving to minimize the vehicle vibration generated at the preselected portion of a vehicle body based on the engine speed.

The phase difference determining means determines a phase difference between the crank angle and the torque variation of the vibration producing means serving to minimize the vehicle vibration according to engine speed and the opening degree of the throttle valve. The phase difference determining means further determines an amplitude of the torque variation of the vibration producing means serving to minimize the vehicle vibration based on the engine speed and the opening degree of the throttle valve.

A vibration sensor means may be provided which detects the resultant vector including the first and second vibration components. The controlling means is responsive to the resultant vector detected by the vibration sensor means to correct the operation timing of the vibration producing means determined based on the phase difference determined by the phase difference determining means to reduce the vehicle vibrations.

The vibration producing means provides the torque variation assuming a phase difference relative to the crank angle which lies in a range from first to second phase differences, the first phase difference being defined between a resultant vector including first and second vibration components in a maximum vibration area of the vehicle body, the second phase difference being defined between a resultant vector including first and second vibration components in a minimum vibration area of the vehicle body.

The amplitude of the torque variation produced by the vibration producing means is set to minimize the sum of an amplitude difference between the first vibration component and a resultant vibration including the first and second vibration components in the maximum vibration area and an amplitude difference between the first vibration component and a resultant vibration including the first and second vibration components in the minimum vibration area.

The vibration producing means is provided with an alternator which uses part of engine torque at the given operation to produce electrical energy, The controlling means controls the operation timing of the alternator to provide the vibration to the engine which is in the phase defined in the preselected relation to the phase difference determined by the phase difference determining means.

The vibration producing means provides the torque variation to the engine by switching power generation mode and motor mode, the power generation mode being used to transform part of engine torque into electrical energy, the motor mode being used to provide an additional torque to the engine. The controlling means controls switching timing between the power generation mode and the motor mode to have the vibration producing means produce the electrical energy required to ensure electrical energy consumed in a given electric load of the vehicle.

The controlling means may control the switching timing between the power generation mode and the motor mode according to a capacity of a battery mounted in the vehicle.

A payload sensor means may be provided which detects a variation in weight of the vehicle for correcting the phase difference between the engine revolution and the frequency of the vehicle vibrations based on the variation in weight of the vehicle detected by the payload sensor means.

The payload sensor means includes a plurality of payload sensors mounted on different portions of the vehicle for determining the center of gravity of the vehicle. The phase difference between the engine revolution and the frequency of the vehicle vibrations is further corrected based on the center of gravity of the vehicle.

A vehicle passenger position sensor means may be provided which monitors position of a vehicle passenger occupying the vehicle for correcting the phase difference between the engine revolution and the frequency of the vehicle vibrations based on the position of the vehicle passenger.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 18 is a flowchart of a program or sequence of logical steps performed by an operation mode determining device of the vibration damping control system, as shown in FIG. 17;

FIG. 20 is a time chart which shows power generation-motor mode switching timing according to an alternative embodiment of the invention;

FIG. 34 is a flowchart of a modification of the vibration damping control shown in FIG. 33;

FIG. 36 is a flowchart of a second modification of the vibration damping control shown in FIG. 33.

DESCRIPTION OF THE PREFERRED EMBODIMENT

Figure 1:
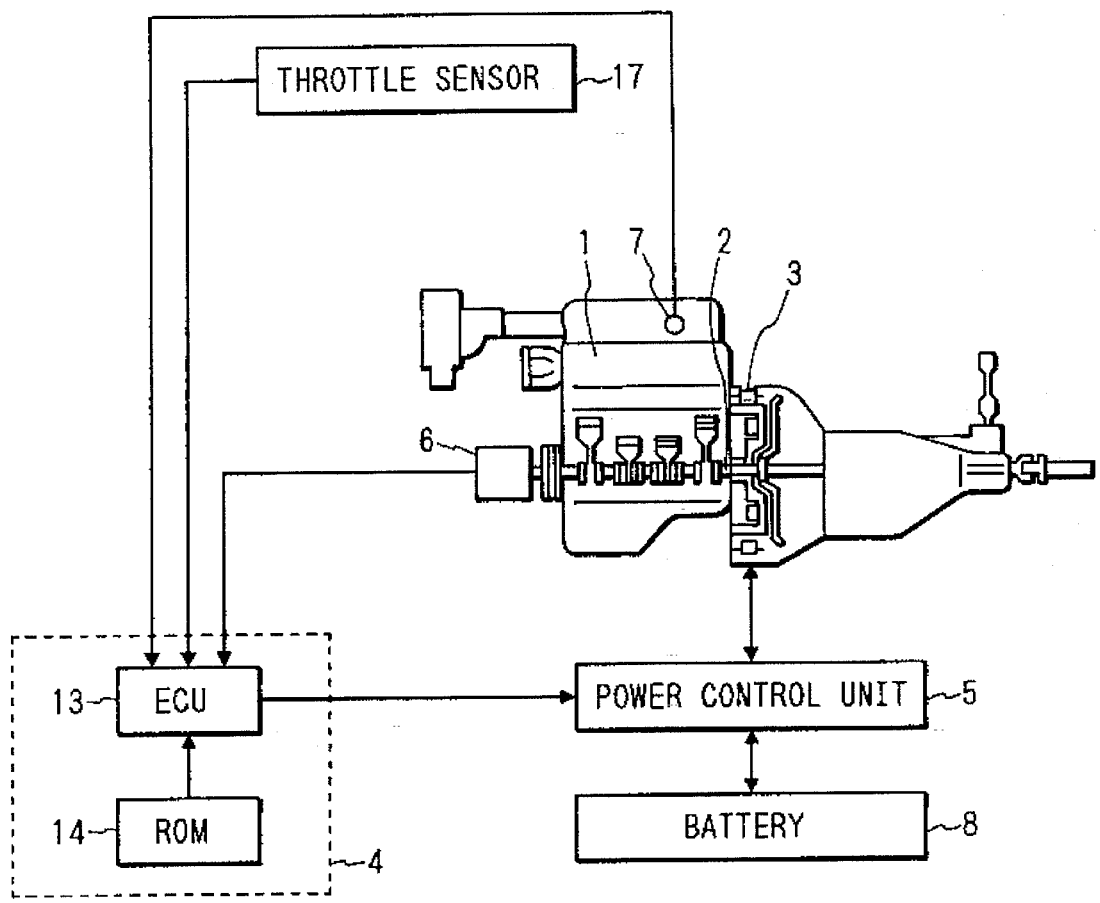
FIG. 1 is a block diagram which shows a vibration damping control system according to the present invention.

Referring now to the drawings, wherein like numbers refer to like parts in several views, particularly to FIG. 1, there is shown a vibration damping control system for an automotive vehicle according to the present invention. The vibration damping control system is adapted for minimizing vibration during engine operation, especially, an engine idling operation, and includes generally an electric generator-motor 3, an operating mode determining device 4, a power control unit 5, a crankshaft position sensor 6, an engine speed sensor 7, a battery 8, and a throttle valve position sensor 17.

The electric generator-motor 3 is connected to a crankshaft 2 of an internal combustion engine 1 to perform the dual torque transmission junction of providing an additional torque to the crankshaft 2 and consuming part of engine torque therethrough. The electric generator-motor 3 is provided with a well-known rotary electric machine which includes an exciting coil and an armature coil, and is capable of selecting between power generating and motor modes according to the degree of voltage applied to each coil. In the power generating mode, the electric generator-motor 3 is responsive to the torque transmitted from the engine 1 through the crankshaft 2 to transform it into electrical energy which is, in turn, charged in the battery 8. In the motor mode, the electric generator-motor 3 is supplied with electric power from the battery 8 to rotate the crankshaft 2 further in the same direction of engine revolution so that an additional torque is provided to the engine 1.

Figure 2:
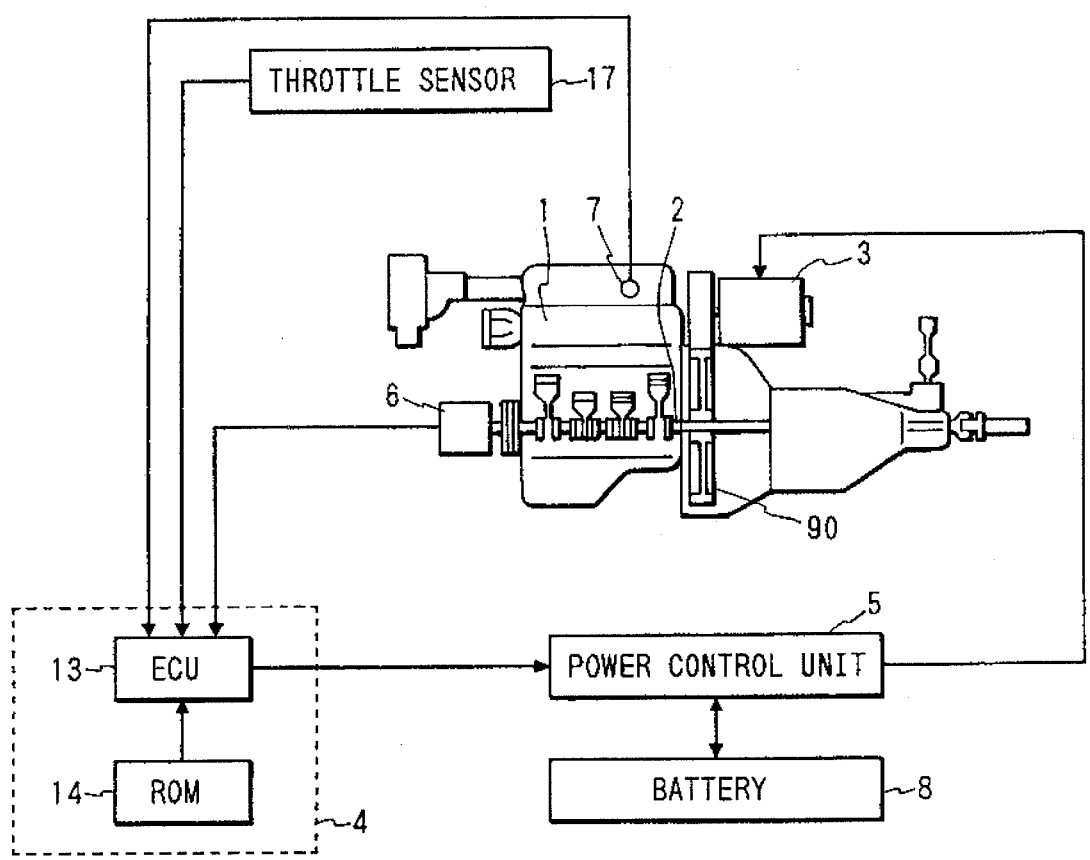
FIG. 2 illustrates an alternative arrangement wherein an electric generator-motor is mechanically connected to a flywheel of an engine.

The electric generator-motor 3 may alternatively be, as shown in FIG. 2, connected to a flywheel 90 of the engine 1.

The throttle valve position sensor 17 detects an opening degree of a throttle valve (not shown) of the engine 1 and provides a signal indicative thereof to the operating mode determining device 4.

The crankshaft position sensor 6 is arranged to detect angular position, or crank angle of the crankshaft 2 of the engine 1, and provides a signal indicative thereof to the operating mode determining device 4.

The engine speed sensor 7 monitors rotational speed of the engine 1 and provides a signal indicative thereof to the operating mode determining device 4. It is known in the art that when the rotational speed of the engine 1 changes, it will cause the phase difference between primary frequency components of vehicle vibrations, as will be described hereinafter, and a crank angle of the crankshaft 2 (i.e., the phase difference between a resultant vector of the primary frequency components of the vehicle vibrations and a reference crank angle) to change.

The operating mode determining device 4 determines torque transmission timing of the electric generator-motor 3 capable of reducing the primary frequency components of the vehicle vibrations, or the phase difference in torque vector variation based on the rotational speed of the engine 1. The power control unit 5 switches between the power generating mode and the motor mode with the torque transmission timing determined by the operating mode determining device 4.

Figure 3:
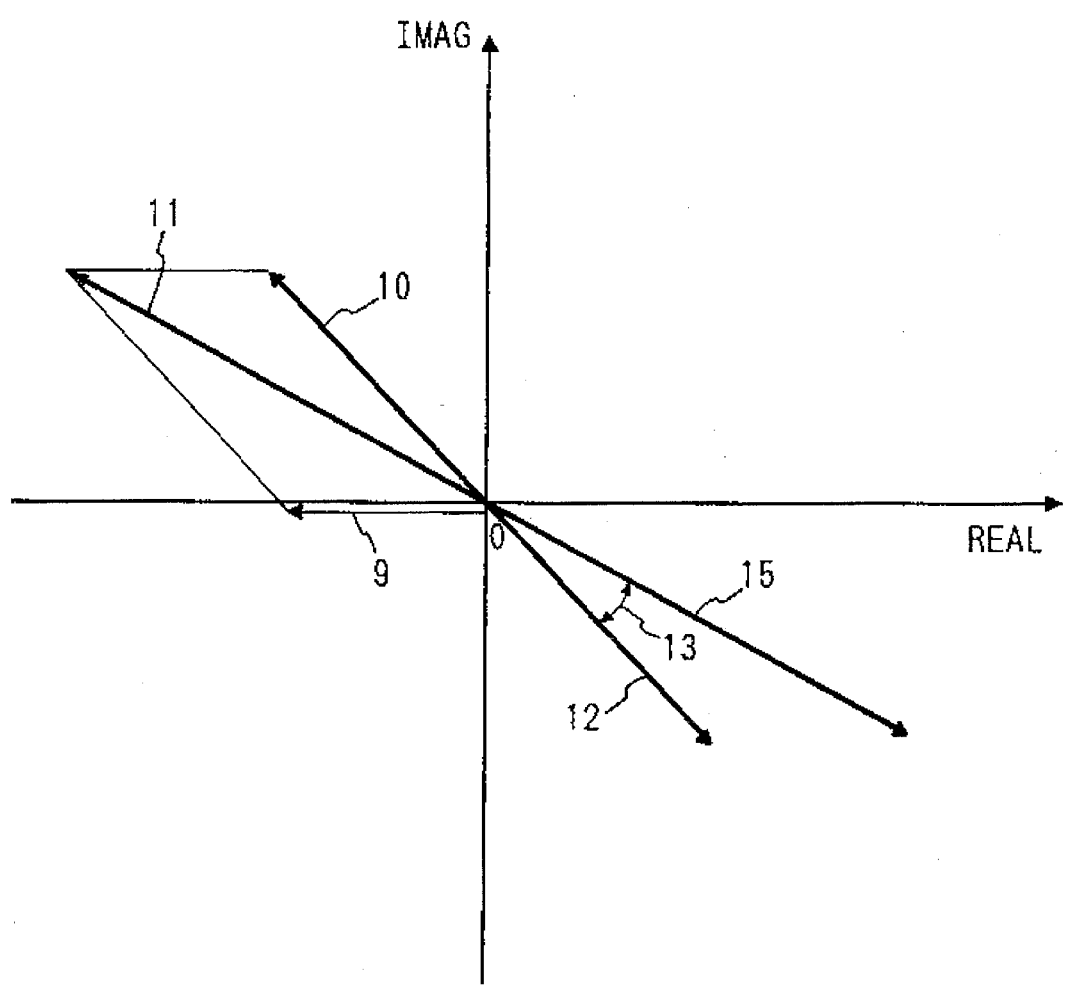
FIG. 3 is a vector illustration which shows a frequency component of vehicle vibration.

To understand the vehicle vibrations the vibration damping control system of the invention intends to control, reference is made to FIG. 3.

In the following discussion on the first embodiment, it is assumed that the vehicle vibration represents vibration of the engine 1 alone, and the transfer function between the engine 1 and a vehicle body, or change rates of phase and amplitude of vibration therebetween are neglected.

In a vehicle on which the engine 1 (e.g., in-line four-cylinder internal combustion engine) is mounted, the primary frequency components of vehicle vibrations, as mentioned above, usually include primary combustion frequency components generated by combustion operation of the engine 1 (the secondary component of engine speed). The main component of the primary combustion frequency components include a vertical vibration of the engine 1 caused by rectilinear movement of a rectilinear part such as a piston of the engine and a rotational vibration generated around a rotational part, or the crankshaft 2. These vibrations have the same frequency in proportion to the frequency of a crank angle signal from the crankshaft position sensor 6, yet there is some phase difference between both the vibrations. The primary frequency components of the vehicle vibrations are, as shown in FIG. 3, represented by a resultant vibration vector 11 formed of a vertical vehicle vibration component 9 caused by the vertical vibration of the engine 1, as mentioned above, (in this discussion, it refers to the vertical vibration of the engine 1 alone, but a vertical vibration component at a particular portion of the vehicle body may alternatively be considered) and a rotational vehicle vibration component 10 developed by the rotational vibration of the engine 1, as explained above, generated around a rotational driving system such as the crankshaft 2 of the engine 1.

The rotational vibration around the crankshaft 2 of the engine 1 assume a preselected phase angle relative to a reference crank angle, or crank angle signal from the crankshaft position sensor 6. This phase angle is subject to change according to engine speed. The rotational vehicle vibration component 10 thus, shows a preselected phase angle relative to the crank angle signal which is also changed according to the engine speed.

Similarly, the vertical vibration of the engine 1 exhibits a preselected phase angle relative to the crank angle signal which undergoes change according to the engine speed. The vertical vehicle vibration component 9 thus shows a preselected phase angle relative to the crank angle which is also changed according to the engine speed.

Accordingly, it will be noted that the primary frequency component (resultant vibration vector) 11 of the vehicle vibration assumes a preselected phase angle relative to the crank angle signal from the crankshaft position sensor 6, which is varied according to the engine speed.

The electric-generator motor 3 is, as shown in FIG. 1, connected to the pistons through the crankshaft 2. The vertical vibration results from vertical displacements of the pistons. Thus, the vertical vibration as well as the rotational vibration is transmitted to the electric-generator motor 3 which is designed to exchange mechanical energy with the pistons through the crankshaft 2.

Therefore, by switching the operational mode of the electric generator-motor between the power generating mode and the motor mode, engine torque variation generated every combustion cycle is smoothed.

As clear from the above, it is the gist of this embodiment to control the operation switching timing of the electric generator-motor 3 between the power generating mode and the motor mode (hereinafter, referred to as "power generation-motor mode switching timing) to produce a vibration damping vector 15, as shown in FIG. 3, having the same frequency as the resultant vibration vector 11 in an opposite phase thereto for reducing the vertical vehicle vibration component 9 and rotational vehicle vibration component 10.

In the first embodiment, a torque, or vibration transmission lag occurring between the electric generator-motor 3 and the vehicle body is, as mentioned previously, neglected. In addition, in FIG. 3, numeral 12 denotes a vibration damping vector having the same frequency as the rotational vehicle vibration component 10 180 deg. out of phase therewith and also having a phase angle 13 relative to the vibration damping vector 15 produced by the electric generator-motor 3.

Figure 4:
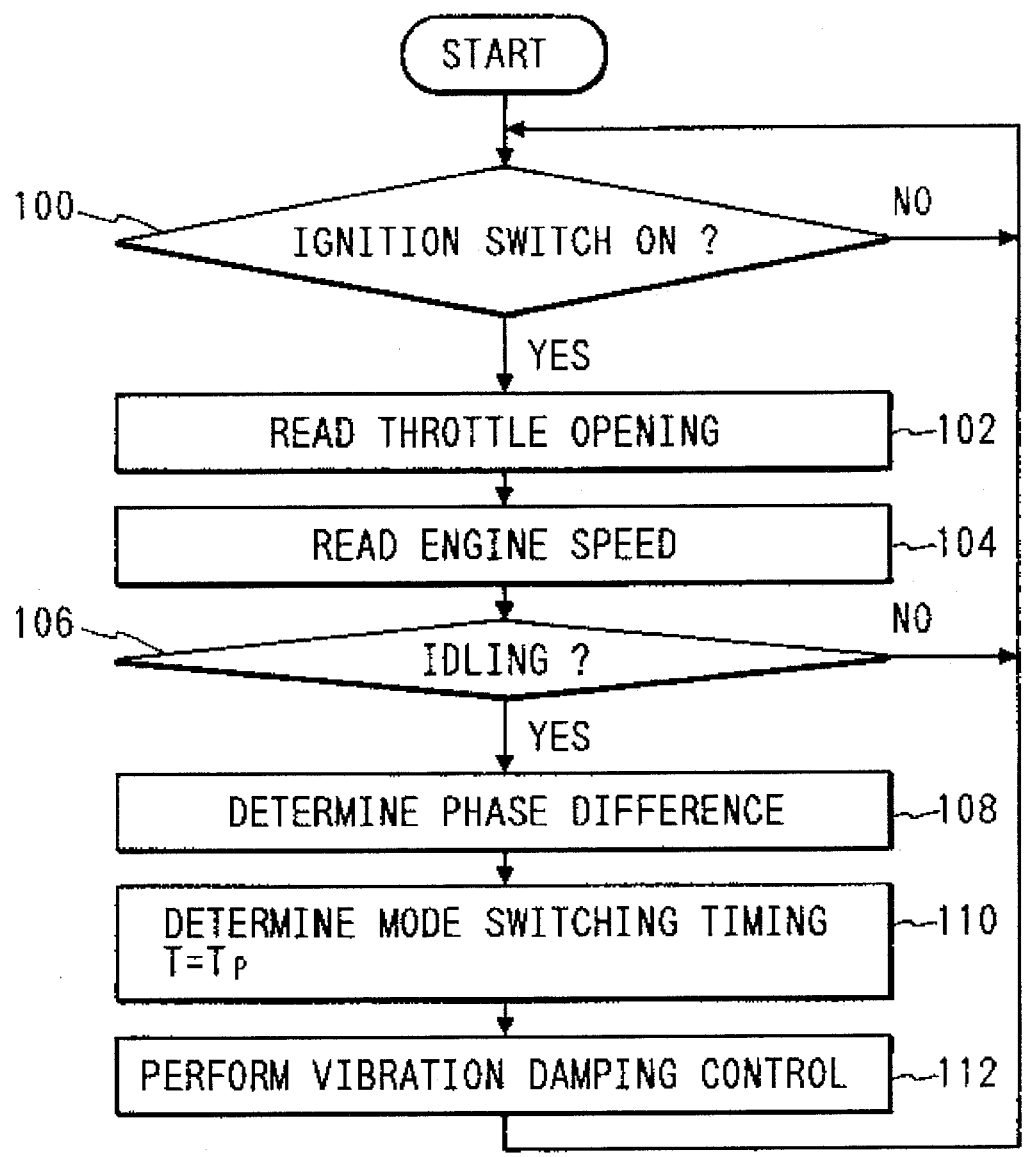
FIG. 4 is a flowchart of a program or sequence of logical steps performed by an operation mode determining device of a vibration damping control system.

Referring to FIG. 4, there is shown a flowchart of a program or sequence of logical steps performed by the vibration damping control system according to the first embodiment.

After entering the program, the routine proceeds to step 100 wherein it is determined whether an ignition switch (not shown) is turned on or not, that is, whether the engine 1 is in operation or not. If a NO answer is obtained, the routine repeats step 100. Alternatively, if a YES answer is obtained, the routine then proceeds to step 102 wherein the opening degree of the throttle valve is read in from the throttle valve position sensor 17. Subsequently, in step 104, the engine speed is read in from the engine speed sensor 7.

The routine then proceeds to step 106 wherein it is determined whether the engine is idling or not based on the opening degree of the throttle valve and the engine speed. If a NO answer is obtained concluding that the engine is not idling, the routine returns back to step 100. Alternatively, if a YES answer is obtained, the routine then proceeds to step 108 wherein a constant value of the phase difference corresponding to an idling speed of the engine 1 is read out of a ROM 14 of the operation mode determining device 4 under the assumption that a variation in the idling speed is usually small and thus a variation in phase difference due to the variation in the idling speed is negligible.

The phase difference, as referred to in the first discussion, is a phase angle between the primary frequency component of the vehicle vibration (the resultant vibration vector 11) and the crank angle. The ROM 14 prestores the constant value of the phase difference of the primary frequency component of the vehicle vibration during idling modes of engine operation.

Subsequently, the routine proceeds to step 110 wherein the power generation-motor mode switching timing T of selecting between the power generation and the motor modes in the electric generator-motor 3 is set to Tp based on the phase difference derived in step 108. In other words, the power generation-motor mode switching timing Tp is determined which is required to have the electric generator-motor 3 produce the torque variation in an opposite phase with the primary frequency component of the vehicle vibration. The power generation-motor mode switching timing may alternatively be directly read out of the ROM 14 in step 110.

The routine then proceeds to step 112 wherein the electric generator-motor 3 is driven with the power generation-motor mode switching timing determined in step 110 to provide compensating torque vibrations for attenuating the vibrations of the engine 1. This operation in detail is performed in the following manner.

Values of voltages to be applied to the exciting coil and the armature coil of the electric generator-motor 3 are read out at every preselected crank angular position based on the sensor signal from the crankshaft position sensor 6 in the electric control unit (ECU) 13 of the operation mode determining device 4. These voltage values are mapped, on a table stored in the ROM 14, at preselected crank angular intervals only over one cycle, respectively. Based on the voltage values, the ECU 13 then provides pulse voltages to the power control unit 5, the pulse voltages having a duty ratio corresponding to the power generation-motor mode switching timing determined. The power control unit 5 power-switches the pulse voltages with the voltage supplied form the battery 8 according to the duty ratio of the pulse voltages, and applies them to the exciting coil and the armature coil of the electric generator-motor 3.

The electric generator-motor 3 is responsive to the pulse voltages from the power control unit 5 to produce a torque variation having the same frequency as the primary frequency component of the vehicle vibration and in an opposite phase relative thereto so that a variation in torque or vibration in an engine idle range is reduced.

In step 112, the electric generator-motor 3 may be operated with the power generation-motor mode switching timing determined to alternately produce electric energy and consume power of the battery 8 at a constant level. This makes the vibration damping control more easy.

With the above vibration damping control according to the first embodiment, a reverse torque variation (i.e., the vibration damping torque 15) 180 deg. shifted in phase from the resultant vibration vector 11 which is advanced in phase relative to the rotational vehicle vibration component 10 and is delayed in phase relative to the vertical vehicle vibration component 9 is produced, thereby enhancing a vehicle vibration damping effect.

Figure 5:
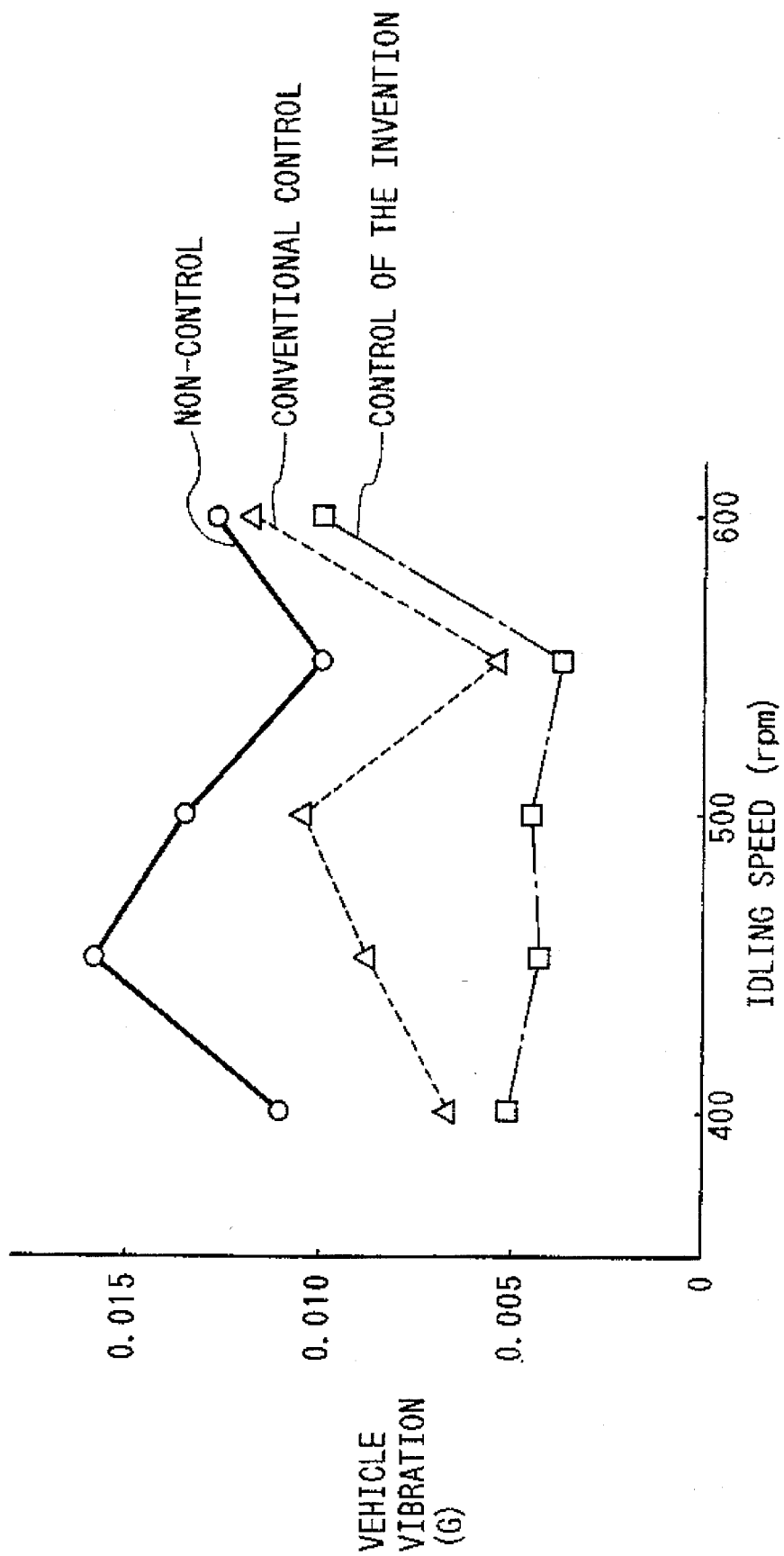
FIG. 5 is a graph which shows the relations between idling speed of an engine and vehicle vibration under non-control, conventional vibration-damping control, and a vibration-damping control of the present invention.

FIG. 5 shows the vibration damping effects under the control of this invention, conventional control, and non-control in tests performed for vibrations of a vehicle body on which an electronic fuel injection type 1.8-liter in-line four-cylinder engine is mounted. A semiconductor acceleration sensor is used for vibration measurement at a portion on a steering wheel. A solid line shows vehicle vibrations under non-control. A broken line shows vehicle vibrations under the conventional control which produces a compensating torque variation (i.e., the vibration damping vector 12) in an opposite phase relative to the rotational vehicle vibration component 10, as shown in FIG. 3. A dashed line represents vehicle vibrations under the control of this invention wherein the compensating torque variation (i.e., the vibration damping vector 15) is produced in an opposite phase relative to the primary frequency component of the vehicle vibration (i.e., the resultant vibration vector 11). The texts reveals that the vehicle vibrations during idling engine operation are greatly reduced under the vibration damping control of this invention.

In the above embodiment, the phase difference between the primary frequency component of the vehicle vibration and the crank angle is read of out the ROM 14. It should be noted, however that the vertical vehicle vibration component 9 and the rotational vehicle vibration component 10 are determined separately from each other to mathematically calculate the resultant vibration vector 11. In this case, the greatest frequency vibration during engine idling modes is attenuated effectively.

The vibration damping control system according to a second embodiment will be explained below with reference to FIG. 4. This embodiment is a modification of the above first embodiment and different therefrom only in step 108. Thus, explanation of other steps in detail will be omitted here.

In step 108, a variation in the phase difference due to a small variation in engine idling frequency is determined by look-up using mapped data stored in the ROM 14 which represent the relation between the phase difference between the primary frequency component of the vehicle vibration and the reference crank angle, and the engine speed.

With the vibration damping control system of the second embodiment, the primary frequency component of the vehicle body during the engine idling modes is reduced effectively even when the engine idling frequency fluctuates slightly.

A third embodiment will be explained below which is also a modification the first embodiment, and performs the same steps, as shown in FIG. 4, except step 108.

Usually, a time lag occurs between production of the torque variation by the electric generator-motor 3 and a time when the torque variation is transmitted to the engine 1 so that the vehicle vibration is damped, thereby causing a phase delay to occur between the torque variation produced by the electric generator-motor 3 and an actual vehicle vibration. This phase delay is caused by a torque transmission lag between the electric generator-motor 3 and the engine 1 and a vibration transmission lag between the engine 1 and the vehicle body. Accordingly, in the third embodiment, the phase difference, as determined in the first embodiment, is corrected based on the phase delay, as explained above, in the following manner.

In step 108, the phase difference between the torque variation of the electric generator-motor 3 and the reference crank angle is read out of the ROM 14, where the torque variation serves to minimize the primary frequency component of the vehicle vibration induced by vibrations transmitted from the engine 1 at a preselected vibration-exciting location (e.g., a seat) on the vehicle body. A first vibration phase difference between vibration (a resultant vibration vector) of the engine 1 and the reference crank angle is summed with a second vibration phase difference corresponding to a time lag required for the vibration of the engine 1 to be transmitted to the vibration-exciting location on the vehicle body. A third phase difference between the primary frequency component of vehicle vibration generated at the preselected vibration-exciting location is subtracted from that sum to obtain the phase difference, that third phase difference resulting from the torque variation of the electric generator-motor 3 and the reference crank angle.

The sum of the first and second phase differences represents the phase difference between the primary frequency component of the vehicle vibration excited at the preselected vibration-exciting location of the vehicle body and the reference crank angle. The difference between the sum of the first and second phase differences and the third phase difference indicates the phase difference between the vibration of the engine 1 at a location where the electric generator-motor 3 is mounted and the reference crank angle. In a subsequent step, the power generation-motor mode switching timing T of selecting between the power generation and the motor modes in the electric generator-motor 3 which produces a torque variation whose phase difference is opposite the phase difference determined above. With this arrangement, the vehicle vibration at the preselected vibration-exciting location (e.g., a seat) of the vehicle body is minimized. It is also desirable that the amplitude of the torque variation of the electric generator-motor 3 be set to minimize the primary frequency component at the preselected vibration-exciting location.

A fourth embodiment will be explained below with reference to FIG. 4. This embodiment is a modification of the second embodiment, and is designed in view of the fact that the amplitude of the primary frequency component of the vehicle vibration (representing vibration of the engine 1 in this embodiment) will be changed according to the variation in engine speed.

This embodiment performs the same steps 100 to 106 as in the second embodiment, and is adapted to modify the amplitude of the torque variation produced by the electric generator-motor 3 according to the variation in engine speed in addition to the phase difference control of the torque variation according to the variation in engine speed.

After step 106, the routine goes to step 108 wherein the phase difference and the amplitude are determined, according to the engine speed, by look-up using mapped data showing the relations between the engine speed and the phase difference and between the engine speed and the amplitude, stored in the ROM 14. This phase difference is, as mentioned above, a phase angle between the primary frequency component (i.e., the resultant vibration vector 11) of the vehicle vibration and the reference crank angle. The amplitude, as discussed herein, represents an amplitude of the primary frequency component of the vehicle vibration (representing vibration of the engine 1 in this embodiment).

Subsequently, in step 110, the power generation-motor mode switching timing of selecting between the power generation and the motor modes in the electric generator-motor 3 and the magnitude of electric energy produced by the electric generator-motor 3, that is, a vibration damping vector are determined based on the phase difference and the amplitude derived in step 108.

In this embodiment, the time required for the torque variation produced by the electric generator-motor 3 to be transmitted to the engine 1 so that the vehicle vibrations are damped is neglected.

With the vibration damping control system of the fourth embodiment, the electric generator-motor 3 operates with the power generation-motor mode switching timing derived in step 110 to provide compensating torque vibrations in an opposite phase relative to the primary frequency component of the vehicle vibration (representing vibration of the engine 1 in this embodiment) with amplitude which is substantially the same as that of the primary frequency component.

A fifth embodiment will be explained below which is a modification of the third embodiment based on the fact that the amplitude of the primary frequency component of the vehicle vibration (representing vibration at the preselected vibration-exciting location on the vehicle body) will be changed according to the variation in engine speed. This embodiment is adapted to control the amplitude of the torque variation produced by the electric generator-motor 3 according to the variation in engine speed in addition to the phase difference control of the torque variation according to the variation in engine speed in the third embodiment.

The steps 100 to 106 are the same as in the third embodiment.

In step 108, the phase difference and the amplitude are determined, according to the engine speed, by look-up using mapped data showing the relations between the engine speed and the phase difference and between the engine speed and the amplitude, stored in the ROM 14. This phase difference represents a phase angle between the reference crank angle and a torque variation generated by the electric generator-motor 3 serving to minimize the primary frequency component of the vehicle vibration excited, at the preselected vibration-exciting location (e.g., a seat) on the vehicle body, by vibrations transmitted from the engine 1. The amplitude, as discussed herein, represents the magnitude of torque variation produced by the electric generator-motor 3 which minimizes the primary frequency component of the vehicle vibration (representing vibration at the preselected vibration-exciting location).

Subsequently, in step 110, the power generation-motor mode switching timing of selecting between the power generation and the motor modes in the electric generator-motor 3 which produces the torque variation in an opposite phase relative to the primary frequency component (i.e., the resultant vibration vector 11) of the vehicle vibration and the magnitude of electric energy produced by the electric generator-motor 3, that is, a vibration damping vector is determined based on the phase difference and the amplitude derived in step 108.

With the vibration damping control system of this embodiment, the electric generator-motor 3 operates with the power generation-motor mode switching timing derived in step 110 to provide compensating vibrations in an opposite phase relative to the primary frequency component of the vehicle vibration with amplitude which is substantially the same as that of the primary frequency component, to the preselected vibration-exciting location on the vehicle body.

A sixth embodiment will be explained below with reference to FIG. 4. This embodiment is a modification of the second to fifth embodiments, and performs step 108, as explained below, after step 106.

Unlike the above second to fifth embodiments which determine the phase difference and/or the amplitude of the torque variation produced by the electric generator-motor 3 by look-up using the table stored in the ROM 14 based on the engine speed, the sixth embodiment has tables in the ROM 14 showing the relations among the phase difference, the engine speed, and the opening degree of the throttle valve and between the amplitude, the engine speed, and the opening degree of the throttle valve, and controls based thereon the torque variation of the electric generator-motor 3.

Usually, during idling modes of engine operation, the throttle valve is not always closed completely. The engine 1 sometimes lies in an idling operation range with the throttle valve being opened slightly. Accordingly, this embodiment features vibration damping control based on the opening degree of the throttle valve during the engine idling operation.

In step 108, the phase difference and the amplitude of the primary frequency component of the vehicle vibration are determined based on the opening degree of the throttle valve and the engine speed derived in steps 102 and 104, respectively.

In the subsequent step 110, the power generation-motor mode switching timing of selecting between the power generation and the motor modes in the electric generator-motor 3 is determined in a similar manner to the above embodiments. In step 112, the electric generator-motor 3 is driven with the power generation-motor mode switching timing determined in step 110.

In addition, the sixth embodiment may alternatively perform step 108, as discussed below.

Initially, the phase difference and the amplitude of the primary frequency component of the vehicle vibration are determined only based on the engine speed during idling modes of engine operation, for example. Subsequently, the phase difference and amplitude correction values are determined in a preselected relation to the opening degree of the throttle valve determined in step 102, and then the phase difference and the amplitude determined previously are corrected according to the phase difference and amplitude correction values.

Figure 6:
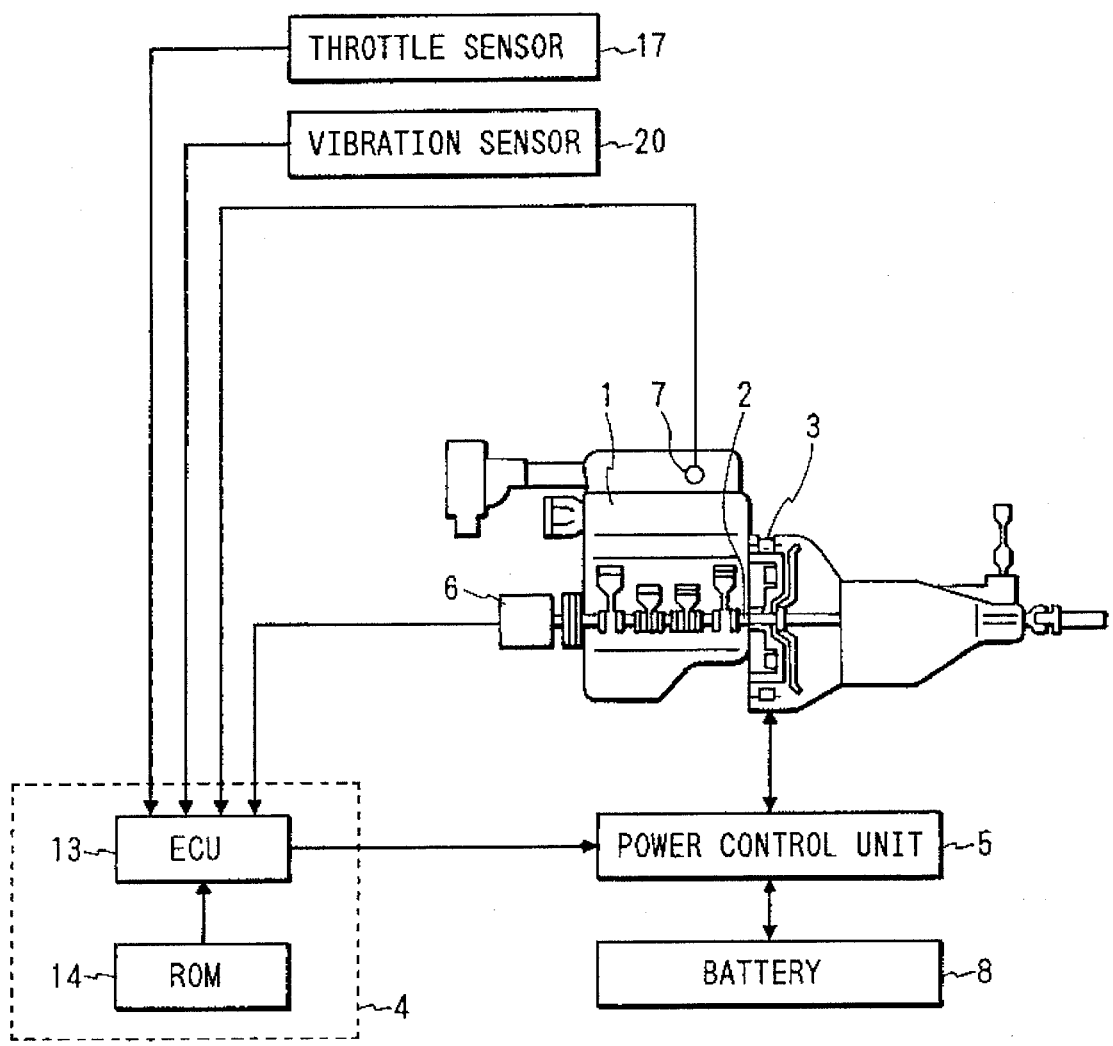
FIG. 6 is a block diagram which shows a vibration damping control system according to an alternative embodiment of the present invention.

Referring to FIG. 6, there is shown a vibration damping control system according to a seventh embodiment of the invention. The system of this embodiment, as shown in the drawing, further includes a vibration sensor 20 for directly detecting the primary frequency component of the vehicle vibration, and performs feedback-control based thereon to correct the power generation-motor mode switching timing of the electric generator-motor 3.

Figure 11:
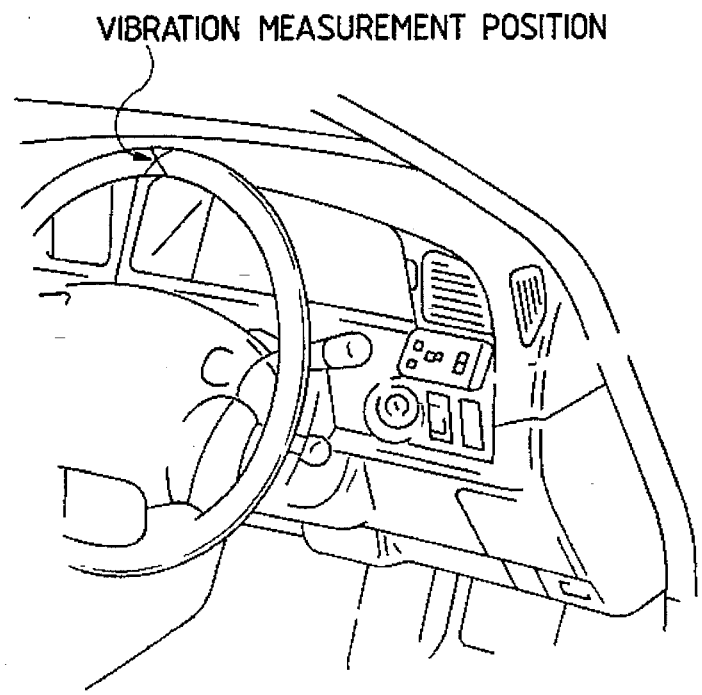
FIG. 11 is an illustration which shows a vibration measurement position on a steering wheel.

The vibration sensor 20 includes a semiconductor acceleration sensor which is, as shown in FIG. 11, mounted on the top of a steering wheel to measure the primary frequency component consisting of the vertical vibration component 9 of the engine 1 and the rotational vibration component 10 around the crankshaft 2 in a direction perpendicular to the steering wheel (i.e., a direction parallel to a steering column).

Figure 7:
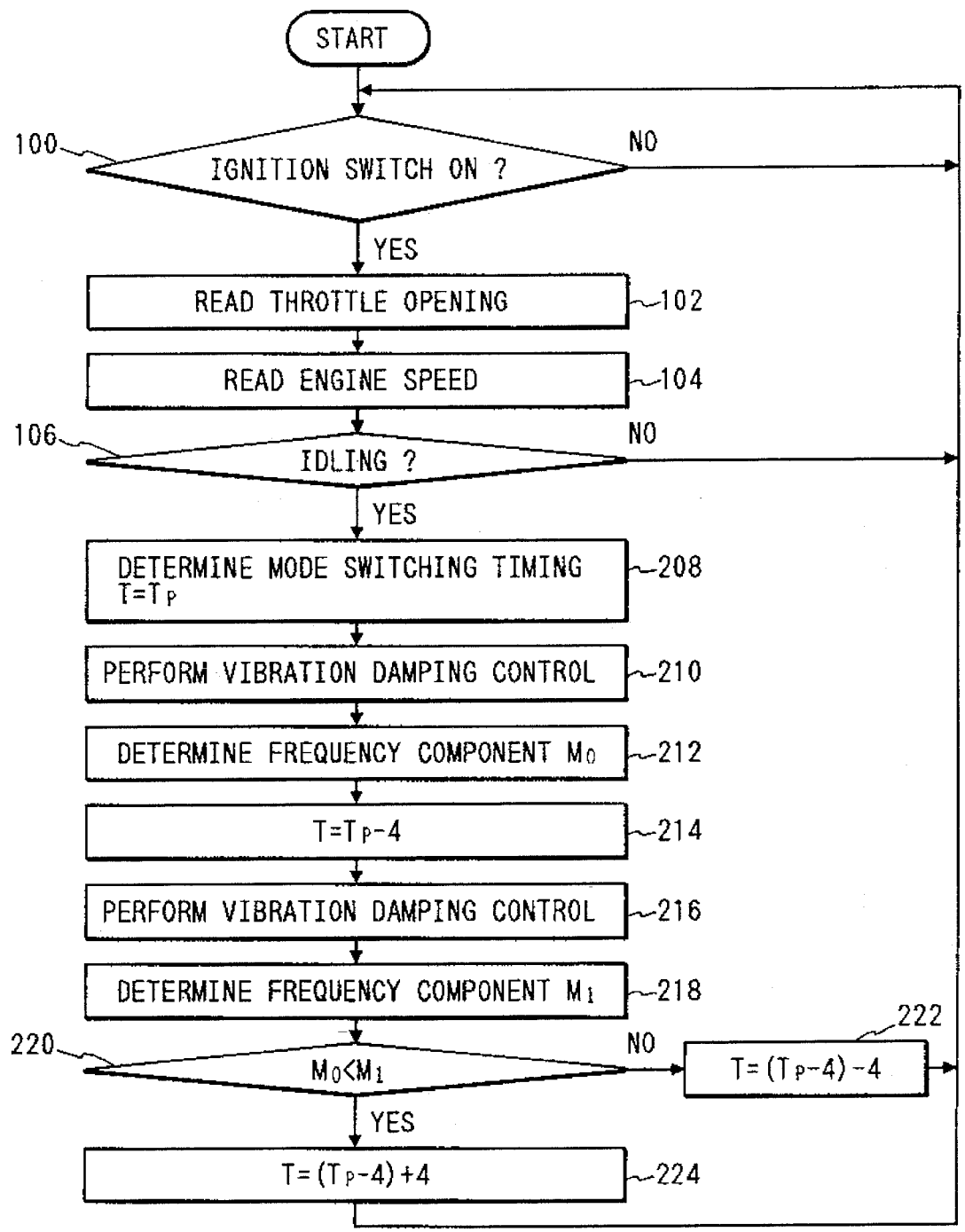
FIG. 7 is a flowchart of a program or sequence of logical steps performed by an operation mode determining device of the vibration damping control system, as shown in FIG. 6.

FIG. 7 shows a flowchart of a program or sequence of logical steps performed by, the operation mode determining device 4 of the seventh embodiment.

Steps 100 to 106 are similar to the ones, as shown in FIG. 4, and explanation thereof in detail will be omitted here for the sake of simplicity.

In step 208, when the control cycle is for the first time, the power generation-motor mode switching timing T is set to a preselected initial value Tp stored in the ROM 14.

The routine then proceeds to step 210 wherein the ECU 13, similar to the operation in step 112, as shown in FIG. 4, provides pulse voltages to the power control unit 5 so that the electric generator-motor 3 produces a torque variation according to the power generation-motor mode switching timing T (=Tp).

The routine then proceeds to step 212 wherein a primary frequency component $M_0$ (i.e., the resultant vibration vector 11) is determined based on a sensor signal output from the vibration sensor 20.

Subsequently, in step 214, the power generation-motor mode switching timing is delayed for a preselected angle, for example, 4 deg. in term of a crank angle. The routine then proceeds to step 216 wherein the same operation as in step 210 is performed so that the electric generator-motor 3 is driven with that power generation-motor mode switching timing.

In step 218, a primary frequency component M 1 is determined based on a sensor signal output from the vibration sensor 20.

The routine then proceeds to step 220 wherein it is determined whether the primary frequency component $M_0$ is smaller than the primary frequency component $M_1$ or not. If a YES answer is obtained ($M_0<M_1$), concluding that the primary frequency component of the vehicle vibration is increased due to the delay of the power generation-motor mode switching timing, the routine then proceeds to step 224 wherein the power generation-motor mode switching timing T is advanced by 4 deg. in terms of an crank angle so that it may be returned to the same timing as in step 208. Alternatively, if a NO answer is obtained in step 220 ($M_0 \leq M_1$), concluding that the primary frequency component $M_0$ is greater than or equal to $M_1$ and thus the primary frequency component $M_1$ is either decreased or balanced with $M_0$, the routine then proceeds to step 222 wherein the power generation-motor mode switching timing T is further delayed for 4 deg. in terms of an crank angle under the assumption that it is possible to further decrease the primary frequency component, after which the routine returns back to the initial step 100. In subsequent control cycles, the routine flows directly from step 106 to 210 if a positive answer is obtained in step 206. With the above feedback control, the primary frequency component is reduced to a minimum.

Figure 8:
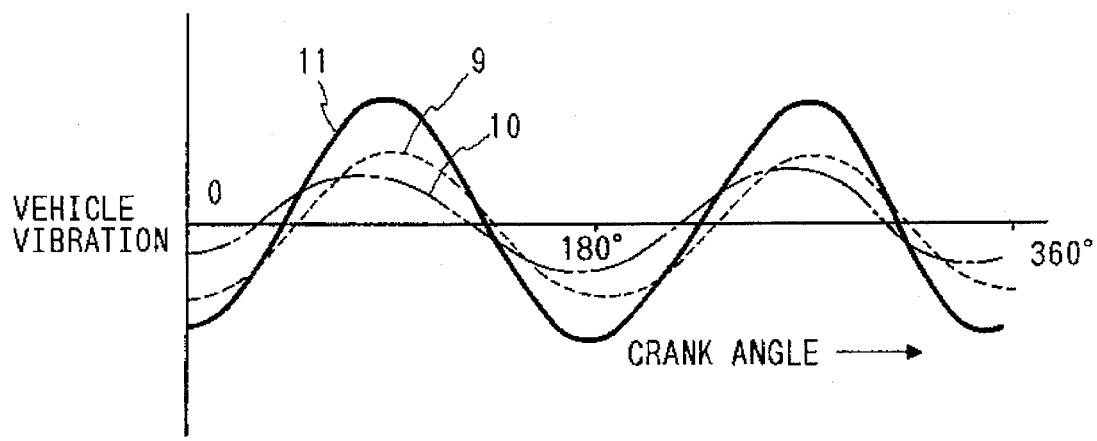
FIG. 8 is a graph which shows variations in vehicle vibration components according to the variation in crank angle.
Figure 9:
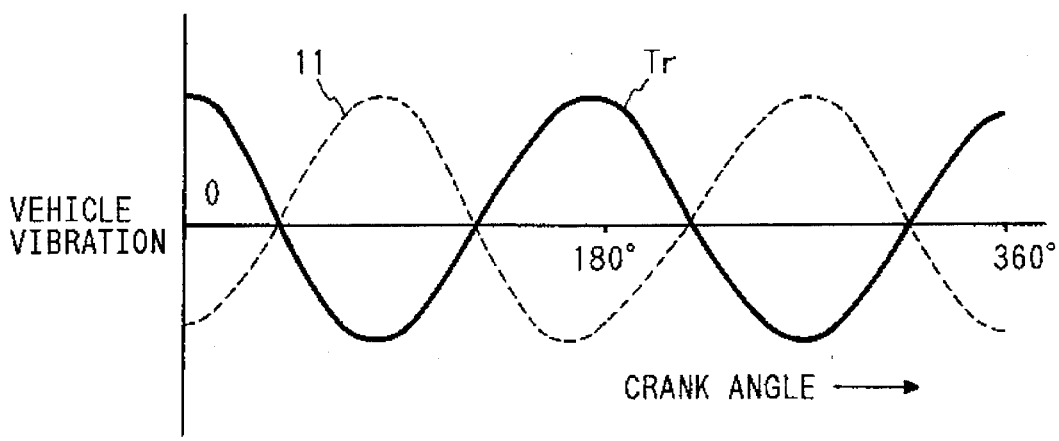
FIG. 9 is a graph which shows a phase angle between vehicle vibration and compensating vibration torque variation produced by an electric generator-motor of a vibration damping control system of the invention.

FIG. 8 shows the relation among the primary frequency component 11, the vertical vehicle vibration component 9, and the rotational vehicle vibration component 10. FIG. 9 shows the relation between the primary frequency component 11 and the variation in vibration compensating torque Tr produced by the electric generator-motor 3.

Figure 10:
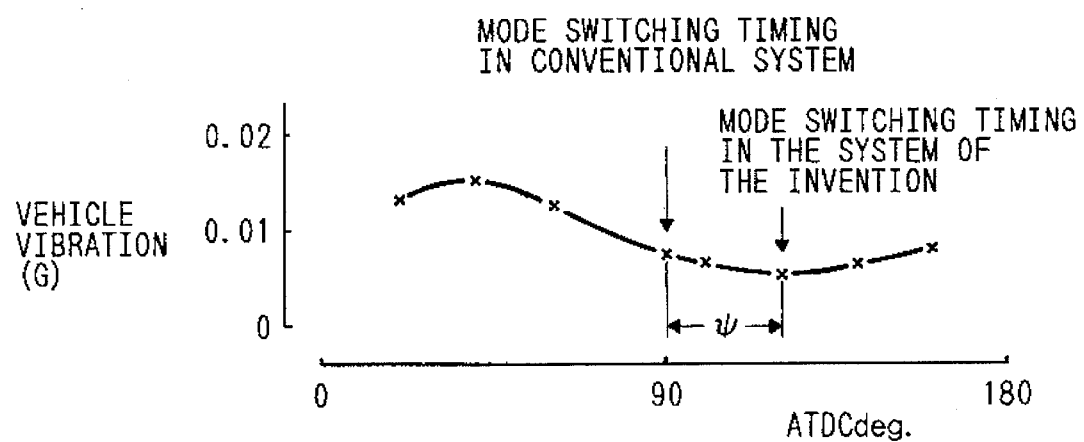
FIG. 10 is a graph which shows the relation between a crank angle and power generation-motor mode switching timing in an electric generator-motor of a vibration damping control system of the invention.

In addition, FIG. 10 shows the relation between the power generation-motor mode switching timing and the vehicle vibration (G) which was measured at an idling engine speed of 400 rpm.

Referring to FIGS. 12 to 16(a), (b), (c), and (d), there is shown an eighth embodiment of the invention.

While the above first and second embodiments neglect the vibration transmission lag between the electric generator-motor 3 and the vehicle body, this embodiment is designed to compensate that vibration transmission lag.

Figure 12:
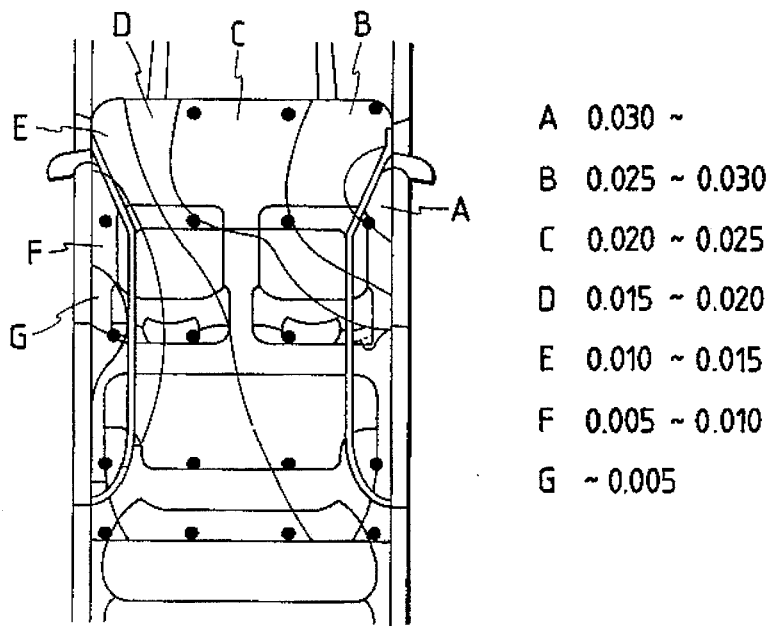
FIGS. 12 and 13 are illustrations which show vibration frequency distributions respectively at an idling engine speed of 400 rpm under non-vibration control and vibration control according to the present invention.
Figure 13:
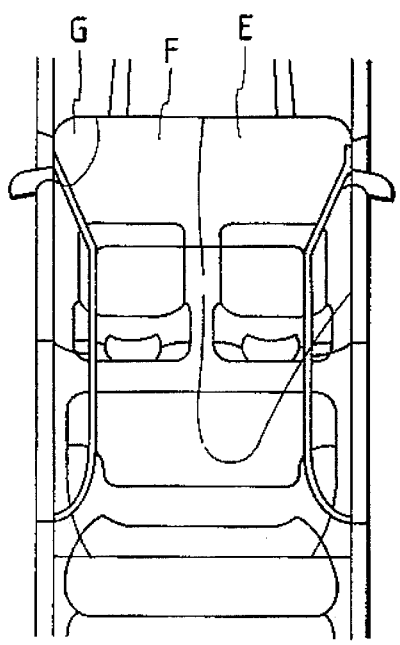

FIGS. 12 and 13 show vibration frequency distributions at an idling engine speed of 400 rpm under non-vibration control and vibration control according to this embodiment, respectively. In FIG. 12, black circles (●) show measurement points.

It will be appreciated from FIG. 12 that under the non-vibration control, a vehicle vibration level is maximized in an area A, while it is minimized in an area G, and intermediate vehicle vibration levels appear in areas B to F. It may be due to the fact that the vehicle vibration, as mentioned previously, includes the resultant vibration vector formed with a vertical vibration and a rotational vibration which is out of phase and different in amplitude with and from the vertical vibration, and thus the phase and amplitude of the vehicle vibration is changed at different portions of the vehicle body due to vehicle body-resonating characteristics.

Figure 14:
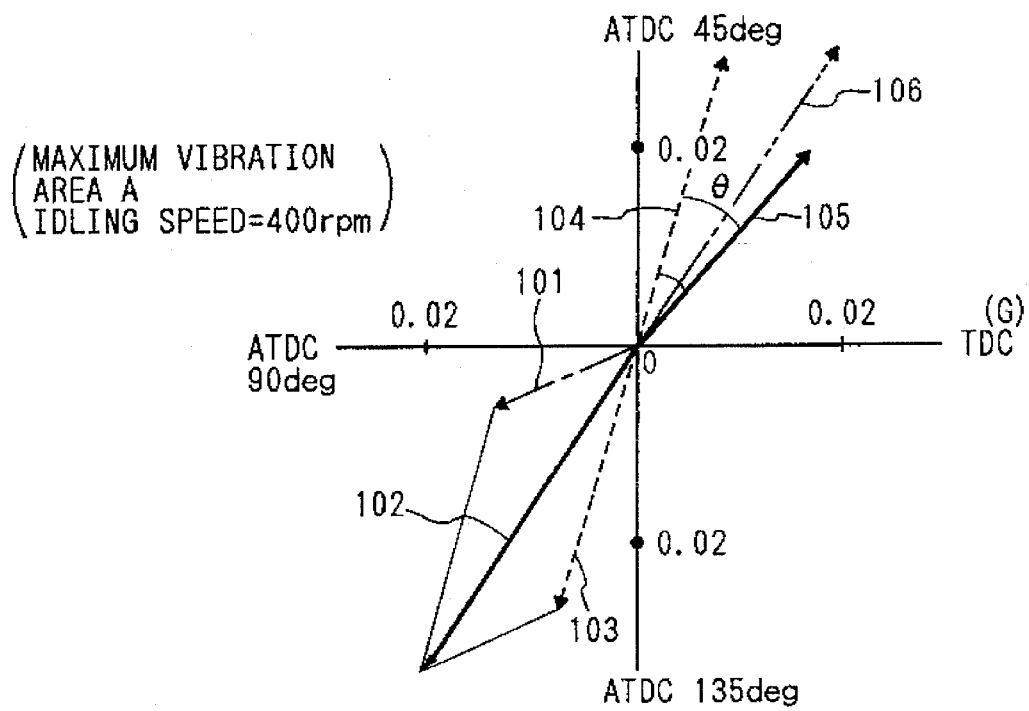
FIG. 14 is an illustration which shows vibration component vectors in a maximum vibration area A, as shown in FIG. 12.

FIG. 14 shows vibration component vectors in the maximum vibration area A, as shown in FIG. 12. As is clear from the drawing, in the maximum vibration area A, the phase difference between a vertical vibration component vector 101 and a rotational vibration component vector 103 is approximately 45 deg. and thus a phase angle therebetween is relatively small so that a resultant vibration vector (i.e., vehicle vibration vector) 102 becomes great.

Figure 15:
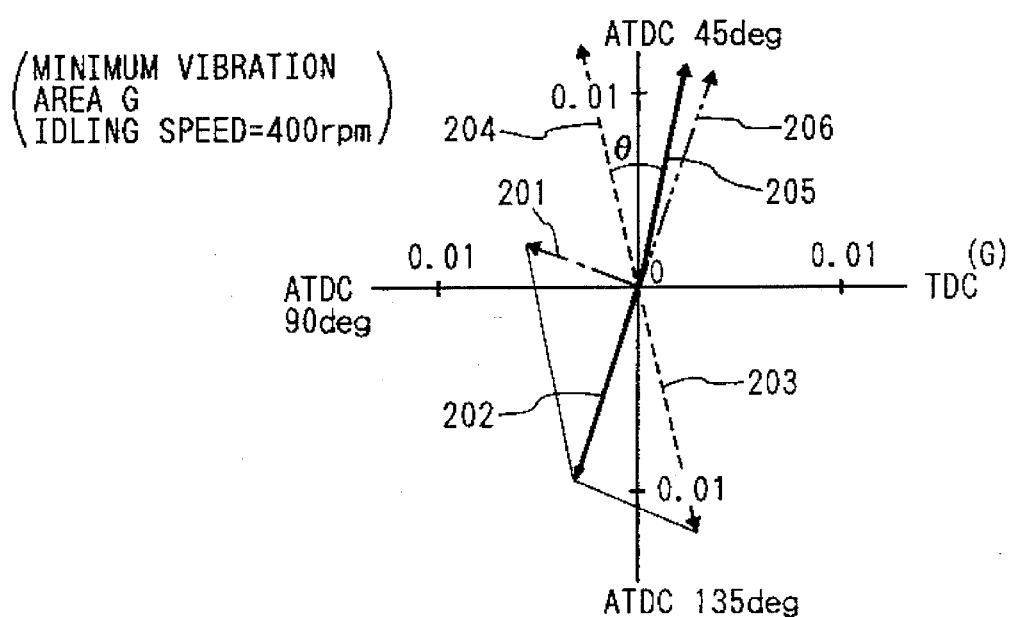
FIG. 15 is an illustration which shows vibration component vectors in a minimum vibration area G, as shown in FIG. 12.
Figure 16:
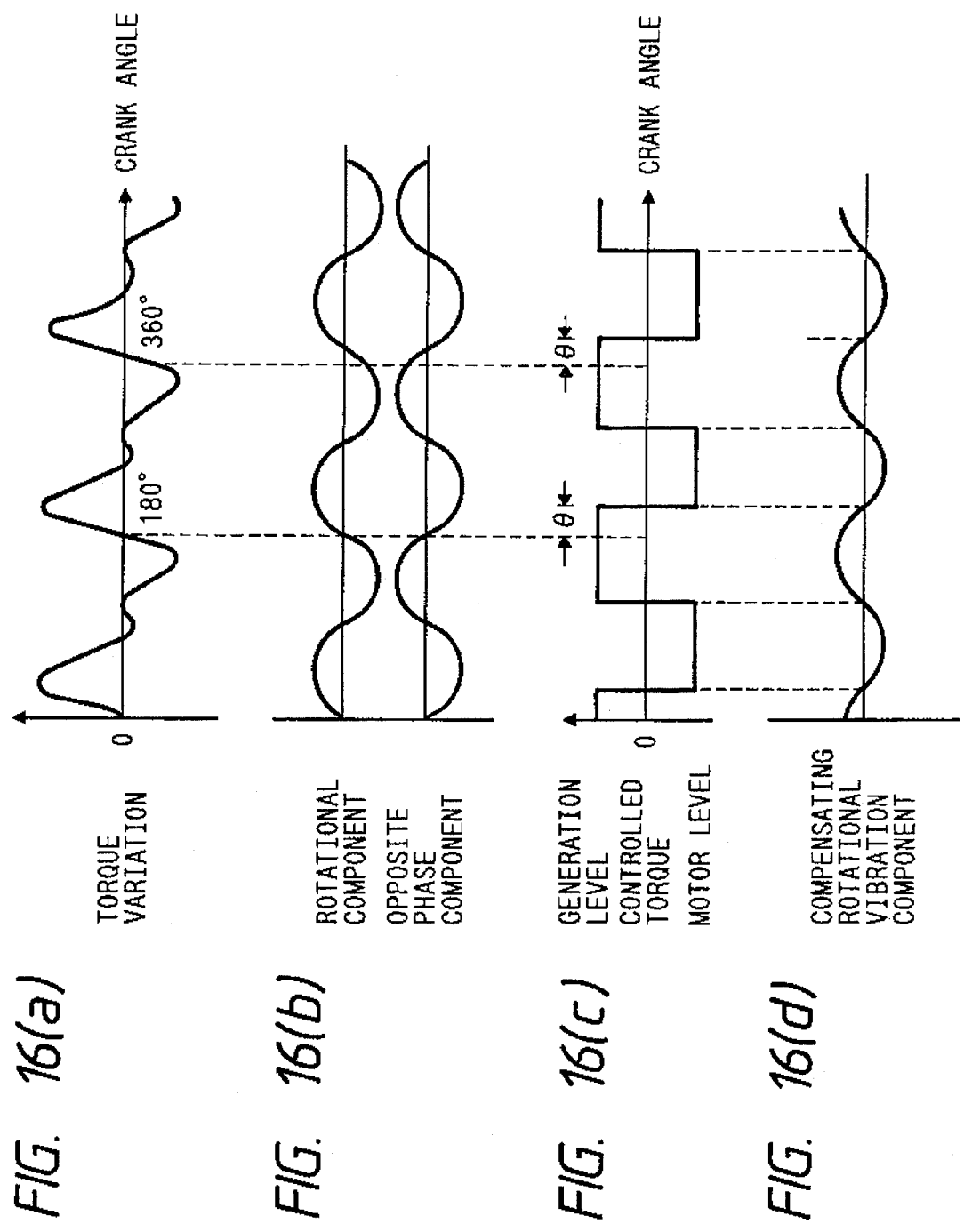
FIG. 16(a) is a graph which shows a torque variation produced by an engine with respect to a crank angle.
FIG. 16(b) is a graph which shows the relation between a rotational vehicle vibration component and a vibration component which is 180 deg. out of phase therewith.
FIG. 16(c) is a graph which shows a controlled torque of an electric generator-motor with respect to a crank angle.
FIG. 16(d) is a graph which shows a primary frequency component of the controlled torque, as shown in FIG. 16(c)

FIG. 15 illustrates vibration component vectors in the minimum vibration area G, as shown in FIG. 12. It will be noted that a vertical vibration component vector 201 is about 120 deg. out of phase with a rotational vibration component vector 203 and thus a phase angle therebetween is relatively great so that a resultant vibration vector 202 becomes small.

The rotational vibration component vectors 103 and 203 are caused by resonance of a vehicle body with a secondary frequency component of engine speed due to the torque vibration of the engine 1, as shown in FIG. 16(a). On the engine 1 as a source of vibration, a rotational vibration component, as shown in FIG. 16(b), will appear.

The electric generator-motor 3 produces a controlled torque variation, as shown in FIG. 16(c), whose primary frequency component appears as a compensating rotational vibration component in a waveform, as shown in FIG. 16(d). Therefore, when the compensating rotational vibration component is shifted to establish a phase angle of θ relative to an opposite phase frequency component, as shown in FIG. 16(b), which is 180 deg. out of phase with the rotational vibration component, a compensating rotational vibration vector 105 of vehicle vibration in the maximum vibration area A, as shown in FIG. 14, appears with a phase angle of θ relative to a vector 104 in an opposite phase relative to the rotational vibration component vector 103. Similarly, a compensating rotational vibration vector 205 of vehicle vibration in the minimum vibration area G, as shown in FIG. 15, appears with a phase angle of θ relative to a vector 204 in an opposite phase relative to the rotational vibration component vector 203.

It will be noted that the compensating rotational vibration vectors 105 and 205 are oriented at the same angle θ to the rotational vibration component vectors 103 (104) and 203 (204).

This embodiment, as will be described hereinafter in detail, is designed to properly adjust the phase angle θ between the compensating rotational vibration vector of the vehicle vibration (103, 203) and the compensating rotational vibration vectors (105, 205) to reduce the vehicle vibrations uniformly at different portions of the vehicle body.

Referring to FIGS. 14 and 15 again, the vector 104, as appreciated above, represents an opposite phase vector which is 180 deg. out of phase with the rotational vibration component vector 103. Similarly, the vector 204 represents an opposite phase vector which is 180 deg. out of phase with the rotational vibration component vector 203. Additionally, the vector 106 is also an opposite phase vector relative to the resultant vector 102 and the vector 206 is an opposite phase vector relative to the resultant vector 202.

Accordingly, as long as the compensating rotational vibration vector 105 is so modified as to be in phase with the opposite vector 106, the resultant vector 102 is minimized in the maximum vibration area A. In the minimum vibration area G, when the compensating rotational vibration vector 205 is so modified as to be in phase with the opposite vector 206, the resultant vector 202 is minimized.

However, when the compensating rotational vibration vector 105 is moved counterclockwise, as viewed in the drawing, into agreement with the opposite vector 106 in order to minimize the vehicle vibration (i.e., the resultant vector 102) in the maximum vibration area A, it will cause the phase angle θ relative to the vector 104 to become small. Thus, the compensating rotational vibration vector 205 is also shifted toward the opposite phase vector 204, thereby causing the phase angle θ to be decreased. This results in the resultant vector 202 not being reduced sufficiently.

Reversely, when the compensating rotational vibration vector 205 is brought into agreement with the opposite phase vector 206 in favor of reduction in vehicle vibration in the minimum vibration area G, it will cause the phase angle θ between the vectors 205 and 204 to become great with the result that the compensating rotational vibration vector 105 in the maximum vibration area A is shifted away from the vector 106, causing the phase angle θ between the vectors 105 and 104 to be increased. Thus, the vehicle vibration (i.e., the resultant vibration vector 102) is not reduced sufficiently.

Accordingly, the vibration damping control system of this embodiment is designed to set the power generation-motor mode switching timing of the electric generator-motor 3 to have a phase angle which is greater than the phase angle θ between the opposite vectors 104 and 106 in the maximum vibration area A and smaller than the phase angle θ between the opposite vectors 204 and 206 in the minimum vibration area G. This adjustment of the power generation-motor mode switching timing dose not provide an optimum vibration-damping effect in each of the maximum vibration area A and the minimum vibration area G, but the vehicle vibrations are reduced uniformly at different portions on the vehicle body.

In operation, the vibration damping control system of this embodiment is substantially the same as in the first embodiment, but different therefrom in the contents of a table stored in the ROM 14 for determining in step 108, as shown in FIG. 4, the phase difference (i.e., the phase angle θ) between the primary frequency component and the reference crank angle.

In the table stored in the ROM 14 of this embodiment, as stated above, data for determining the phase difference (i.e., the phase angle θ) between the primary frequency component and the reference crank angle according to engine speed, are stored within a range from the phase angle θ between the opposite phase vectors 104 and 106 in the maximum vibration area A to the phase angle θ between the opposite phase vectors 204 and 206 in the minimum vibration area G.

The phase difference θ within the above range may be set to a phase angle between a resultant of the vectors 106 and 206 and the vector 104.

In addition, the phase difference θ may alternatively be set to a phase angle between an opposite phase vector relative to a rotational vibration component vector and an opposite phase vector relative to a resultant vibration vector of vehicle vibration measured in a specific point in the intermediate-vibration area C. With the vibration damping control based on the phase angle thus determined, on a driver' seat in the intermediate vibration area C, vehicle vibration is reduced to a minimum.

Further, the phase difference θ may be set to a phase angle between an opposite phase vector relative to a rotational vibration component vector and an opposite phase vector relative to a resultant vibration vector of vehicle vibration measured at a specific point in the maximum vibration area A.

A ninth embodiment will be explained below. This embodiment is designed to modify the amplitude of the torque variation produced by the electric generator-motor 3 based on a variation in amplitude of the vehicle vibration.

A vibration damping operation of this embodiment is substantially the same as in the first embodiment, as shown in FIG. 4, but different therefrom only in that in step 108, the amplitude of the controlled torque variation produced by the electric generator-motor 3 is determined in addition to the phase difference.

Likewise to the fourth embodiment, as discussed previously, in step 108, the phase difference and the amplitude are determined, according to the engine speed, by look-up using mapped data showing the relations between the engine speed and the phase difference and between the engine speed and the amplitude, stored in the ROM 14. The amplitude of the controlled torque variation is so defined as to minimize the sum of an amplitude difference between the compensating rotational vibration component vector 105 and the opposite phase vector 106 relative to the resultant vibration vector 102 and an amplitude difference between the compensating rotational vibration component vector 205 and the opposite phase vector 206 relative to the resultant vibration vector 202.

The phase difference θ, as explained in the above eighth embodiment may alternatively be set to a phase angle between an opposite phase vector relative to a rotational vibration component vector and an opposite phase vector relative to a resultant vibration vector of vehicle vibration measured in a specific point in the intermediate vibration area C. In this case, the electric generator-motor 3 may produce a controlled torque variation to have the compensating rotational vibration component agree with the opposite phase vector relative to the resultant vibration vector of the vehicle vibration in the intermediate vibration area C. With the vibration damping control based on the phase angle and the amplitude thus determined, on a driver' seat in the intermediate vibration area C, the vehicle vibration is reduced to a minimum.

Additionally, the phase difference θ may be set to a phase angle between an opposite phase vector relative to a rotational vibration component vector and an opposite phase vector relative to a resultant vibration vector of vehicle vibration measured at a specific point in the maximum vibration area A. The electric generator-motor 3 may produce a controlled torque variation to have the compensating rotational vibration component agree with the opposite phase vector relative to the resultant vibration vector of the vehicle vibration in the maximum vibration area A.

Figure 17:
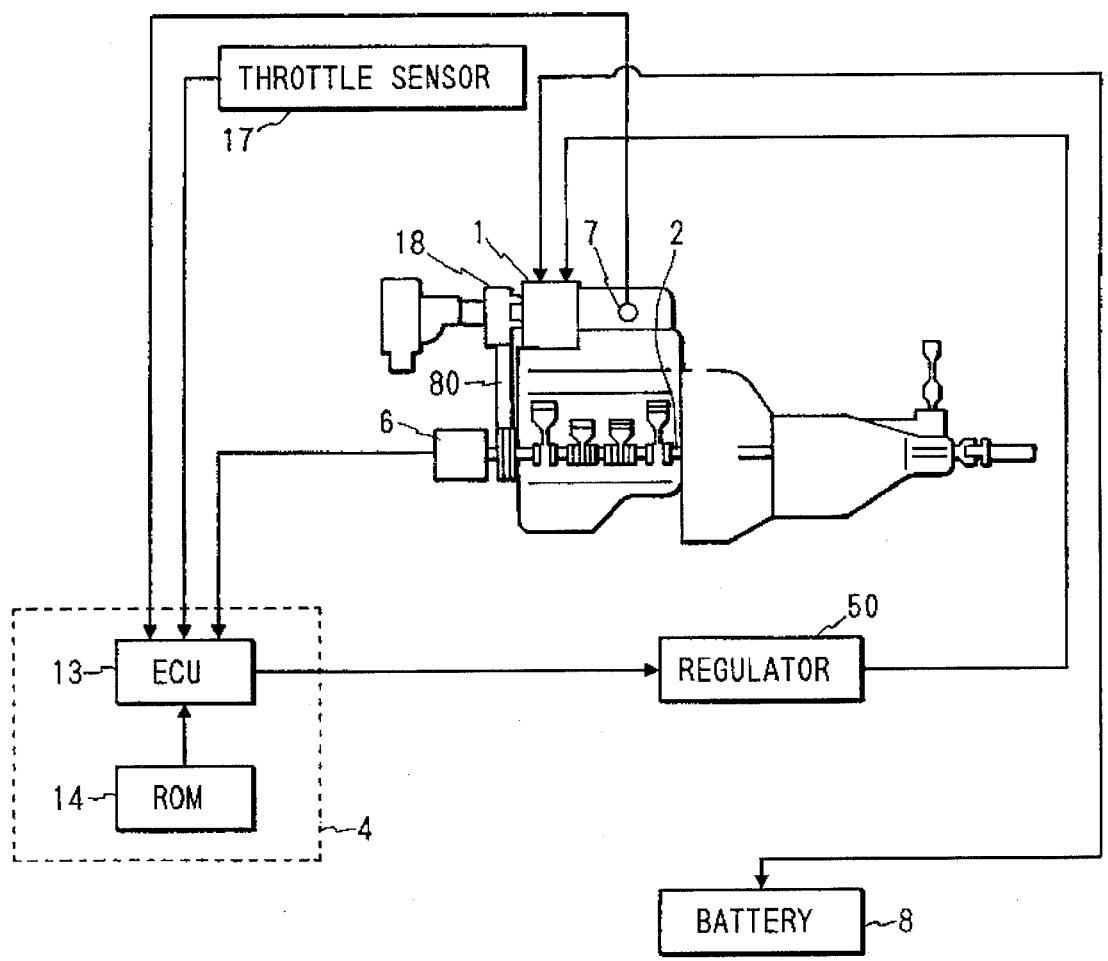
FIG. 17 is a block diagram which shows a vibration damping control system according to an alternative embodiment of the present invention.

Referring to FIG. 17, there is shown a vibration damping control system according to a tenth embodiment of the invention.

This vibration damping control system is designed to produce a vibration damping torque using an alternator (three phase current generator) 18 in place of the electric generator-motor 3 in the above embodiments. The alternator 18 is commonly in drive connection with the crankshaft 2 through a belt 80, and produces electric energy based on a duty ratio of an exciting pulse signal sent from a regulator 50 to charge the battery 8 for supplying the electric power to some electrical loads such as head lamps or audio system (not shown). Other arrangements and operations are substantially the same as the above embodiments and explanation thereof in detail will be omitted here for the sake of brevity.

Referring to FIG. 18, a flowchart of logical steps performed by the operation mode determining device 4.

After step 110 or 214, as shown in FIGS. 4 and 7, the routine proceeds to step 300 wherein a current duty ratio τ of the exciting pulse signal output from the regulator 50 under conventional control charging the power in the battery 8, is detected.

Figure 19A:
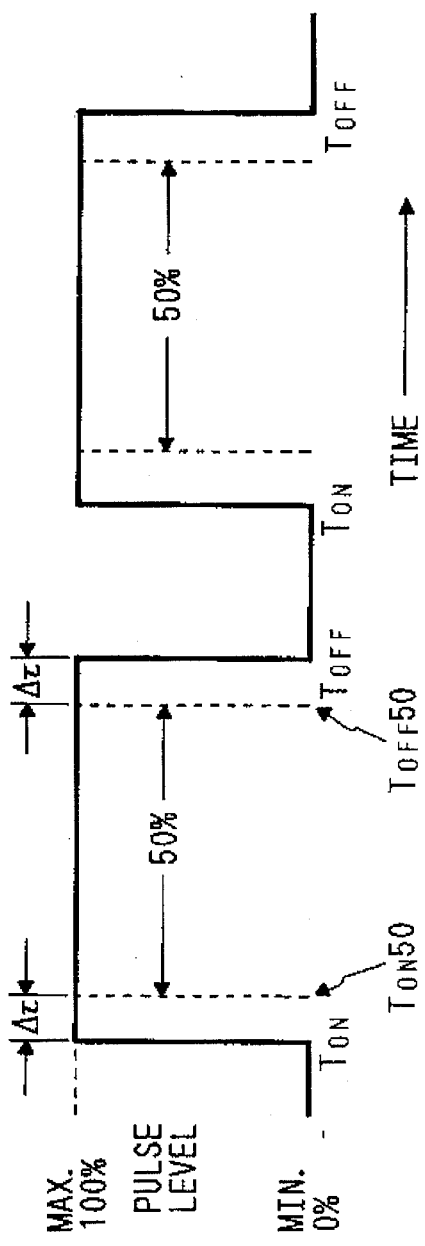
FIG. 19(a) is a time chart which shows an exciting pulse voltage applied to an alternator.
Figure 19B:
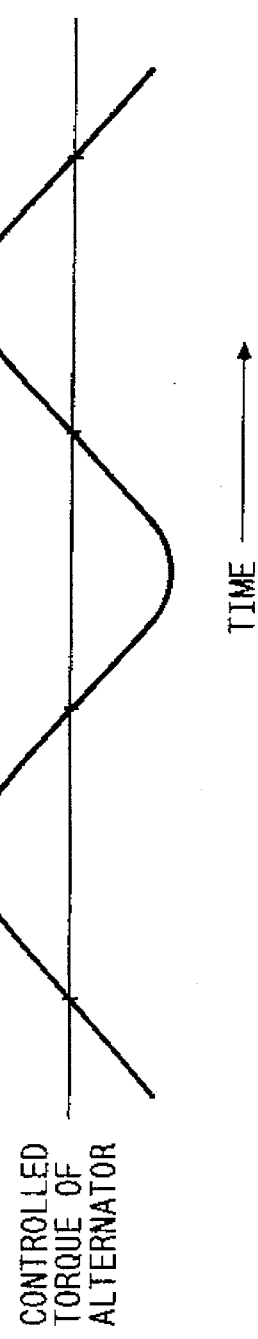
FIG. 19(b) is a time chart which shows a compensating torque variation produced by an alternator.

The routine then proceeds to step 301 wherein based on the current duty ratio τ derived in step 300, an rising edge (i.e., power generation-on timing $T_{on}$) and a falling edge (i.e., power generation-off timing $T_{off}$) of the exciting pulse signal, as shown in FIG. 19(a) are initially determined. Usually, the exciting pulse signal, as appreciated in the drawing, has a duty ratio of more than 50% for charging the battery 8. Subsequently, a duty ratio correction value Δτ is determined according to the relation of Δτ=(τ−50%)/2. The duty ratio correction value ΔT represents a value required for shifting the current duty ratio τ to a duty ratio of 50% of a pulse signal which rises at $T_{on50}$ and falls at $T_{off50}$ to have the magnitudes of positive and negative torques, as shown in FIG. 19(b), be equal to each other.

The routine then proceeds to step 112 or 216 wherein the pulse signal at duty ratio of 50% is applied to the alternator 18 with the power generation-motor mode switching timing T derived in step 110 or 214 so that it produces the torque variation which is 180 deg. out of phase with the primary frequency component of vehicle vibration.

An eleventh embodiment will be described with reference to FIGS. 1 and 20.

In the above mentioned first to ninth embodiments, the operation of the electric generator-motor 3 is, as shown in FIG. 16(c), switched between the power generation mode and the motor mode every cycle of 180 deg. with the same level (i.e., amplitude) or controlled so as to produce power-generation and motor voltages in the form of a sine wave or given wave.

Generally, in automotive vehicles, the power of the battery 8 is consumed in activating some electric loads (e.g., head lamps, an audio system). The electric generator-motor 3 also consumes some power of the battery 8 in producing a positive torque in the motor mode. Therefore, when cycles of the power generation mode and the motor mode are set equal to each other, it will cause the positive torque in the motor mode to be reduced in amplitude due to the power consumption in the electric loads of the vehicle. Accordingly, the vibration damping control system of the eleventh embodiment is, as shown in FIG. 20, designed to switch between the power generation mode and the motor mode every cycle of 180 deg. with the same level of 100%, but correct the length of time (i.e., a duty ratio) the electric generator-motor 3 is in the power generation mode so that the quantity of power produced by the power generation operation in one cycle of the power generation mode may become equal to the quantity of power consumed by the motor operation in one cycle of the motor mode plus the quantity of power required for operating the electric loads of the vehicle.

With the above control of the eleventh embodiment, the amplitude of vibration-damping torque variation produced by the electric generator-motor 3 becomes stable. Of course, this embodiment is applicable to the alternator control, as discussed above.

Figure 21:
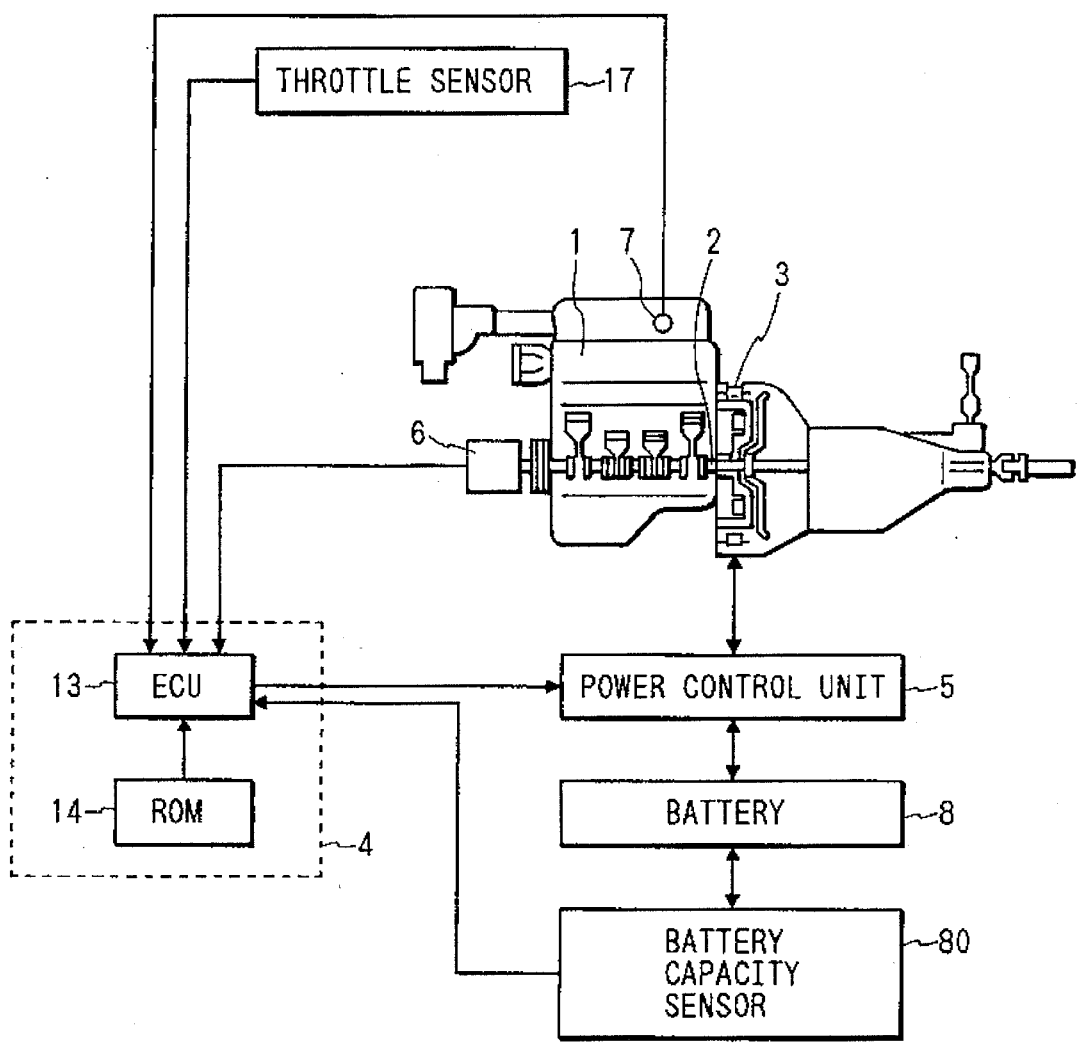
FIG. 21 is a block diagram which shows a vibration damping control system according to an alternative embodiment of the present invention.

Referring to FIG. 21, there is shown a vibration damping control system according to a twelfth embodiment of the invention.

This vibration damping control system includes a battery capacity sensor 80, and features switching the operation modes of the electric generator-motor 3 based on the capacity of the battery 3. This embodiment may also be applied to the tenth embodiment to switch the operation modes of the alternator 18 based on the capacity of the battery 8.

The electric generator-motor 3, as discussed already, operates between a maximum power generation level and a maximum power consumption level to produce a maximum vibration-damping torque variation. Of course, in the case where the vibration-damping torque required may be small, the electric generator-motor 3 may also operate between smaller power generation and power consumption levels than the maximum power generation and power consumption levels.

In addition, as discussed in the above tenth and eleventh embodiments, a ratio of power generation mode cycle to motor mode cycle (i.e., a duty ratio of a pulse signal applied to the alternator 18) may be modified to create electric energy required for driving some electric loads, which is, in turn, accumulated in the battery 8. In this embodiment, the electric energy created is controlled according to the capacity of the battery 8 in the following manner.

The battery capacity sensor 80 is formed of an electric signal-outputting type of density sensor or otherwise provided with an annmeter detecting the amount of current flowing between the battery 8 and the power control unit 5. Additionally, it is also desired to project the existing capacity of the battery 8 based on the present input/output current, terminal voltage, and the number of years worked of the battery 8.

Figure 22:
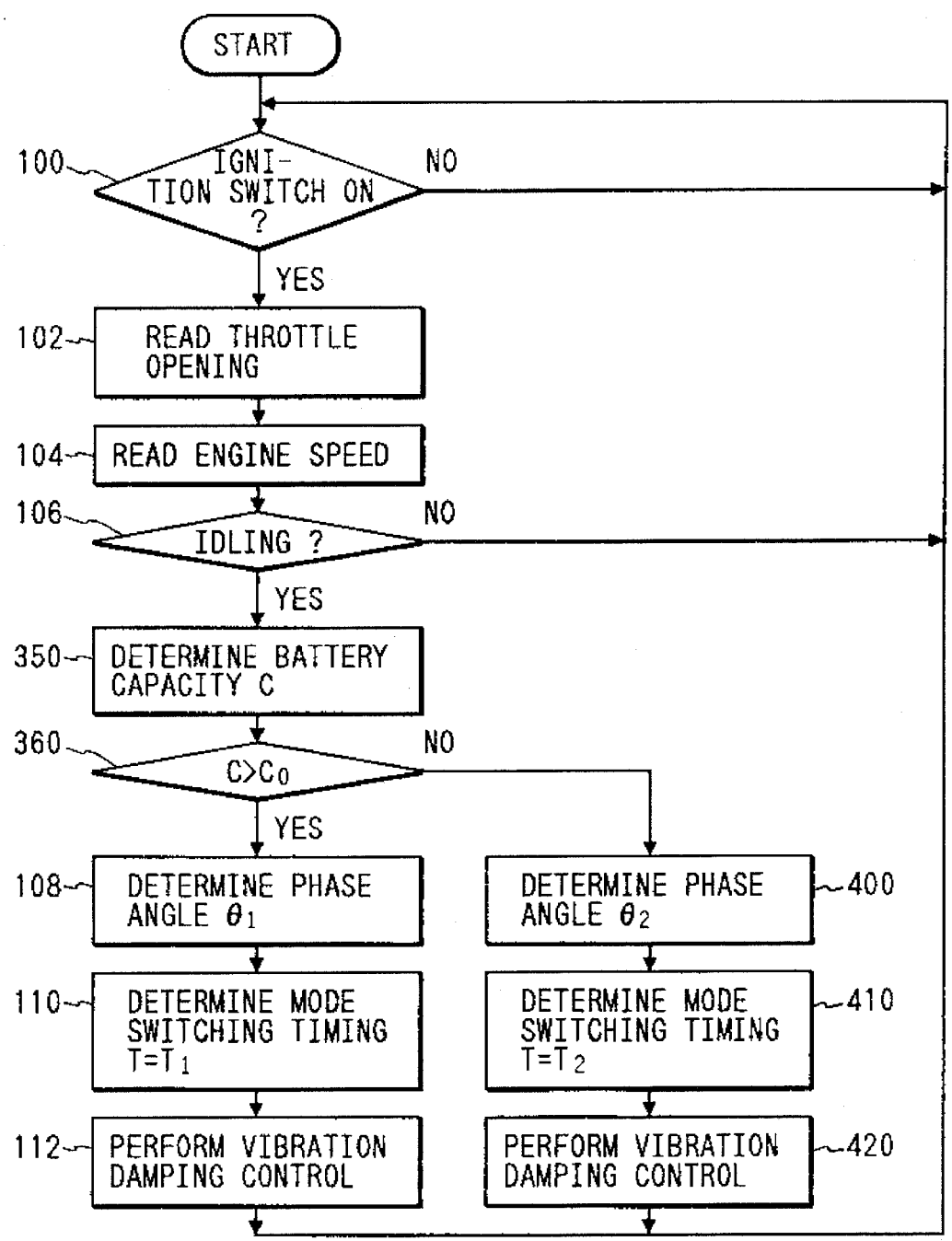
FIG. 22 is a flowchart of a program or sequence of logical steps performed by an operation mode determining device of the vibration damping control system, as shown in FIG. 21.

Referring to FIG. 22, there is shown a flowchart according to twelfth embodiment. Steps 101 to 106 are the same as in the above embodiment, and no attempt will be made here to describe them.

After a YES answer is obtained in step 106 concluding that the engine is in the idling mode now, the routine proceeds to step 350 wherein a battery capacity C is determined based on a sensor signal from the battery capacity sensor 80.

The routine then proceeds to step 360 wherein it is determined whether the battery capacity C determined in step 350 is greater than a preselected threshold level Co or not. If a YES answer is obtained concluding that there is no need for charging the battery 8, the routine then enters a flow of steps 108 to 112 which are the same as the ones shown in FIG. 4.

Alternatively, if a NO answer is obtained in step 360, concluding that the battery 8 is insufficient in capacity, the routine then proceeds to step 400 wherein a phase angle $\theta_2$ between a torque variation to be produced by the electric generator-motor 3 and the reference crank angle is determined. The phase angle $\theta_2$ is different from the phase angle $\theta_1$ in step 108. This is because changing the power generation-motor mode switching timing in a subsequent step 410 causes torque produced by the electric generator-motor 3 acting on the engine 1 to be changed as compared with the torque produced in step 112, resulting in the primary frequency component of the vehicle vibration being changed in phase.

Subsequently, the routine proceeds to step 410 wherein the power generation-motor mode switching timing T is set to $T_2$ which is defined to have the cycle time of the power generation mode of the electric generator-motor 3 longer than the cycle time of the motor mode thereof to provide more electric power to the battery 8. This makes it possible to ensure a steady supply of power to another electric load such as head lamps.

The routine then proceeds to step 420 wherein the electric generator-motor is controlled to produce a vibration-compensating torque variation with the power generation-motor mode switching timing. The routine then returns back to step 100.

Figure 23:
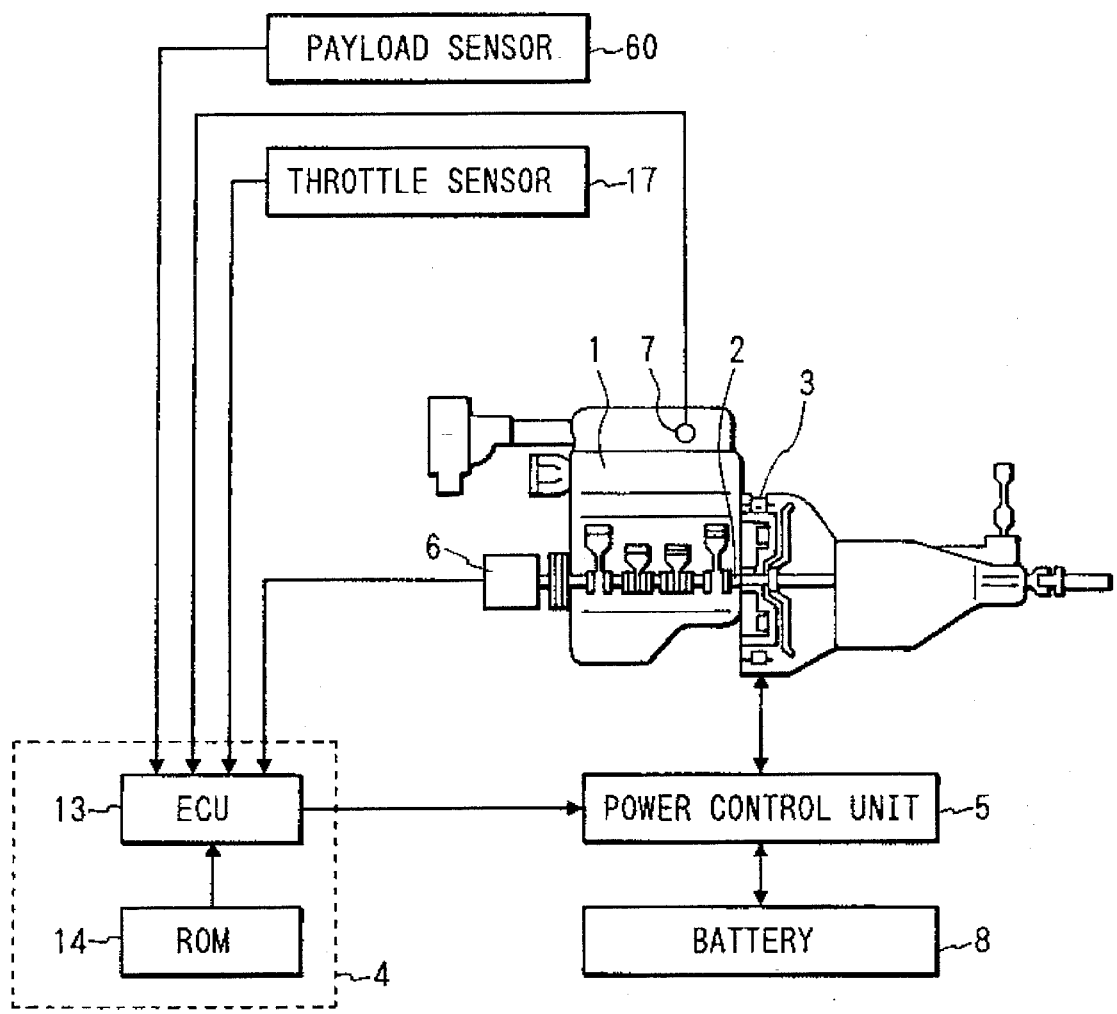
FIG. 23 is a block diagram which shows a vibration damping control system according to an alternative embodiment of the present invention.

A vibration damping control system according to a thirteenth embodiment of the invention will be described below with reference to FIGS. 23 to 25.

The vibration damping control system of this embodiment includes a payload sensor 60 which is so constructed as to monitor vehicle weight or its variation and provides a signal indicative thereof to the operation mode determining device 4 for modifying the power generation-motor mode switching timing T based thereon. The payload sensor 60 may be provided with a conventional stroke sensor which is mounted on a shock absorber.

Figure 24:
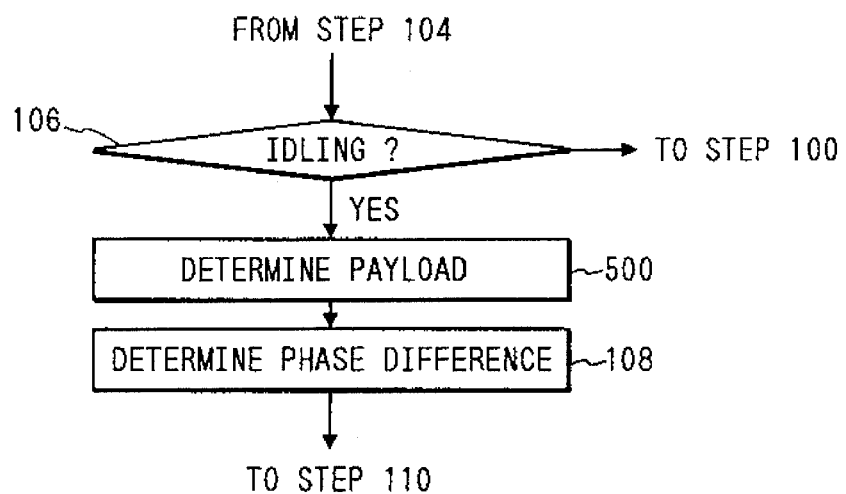
FIG. 24 is a flowchart of a program or sequence of logical steps performed by an operation mode determining device of the vibration damping control system, as shown in FIG. 23.
Figure 25:
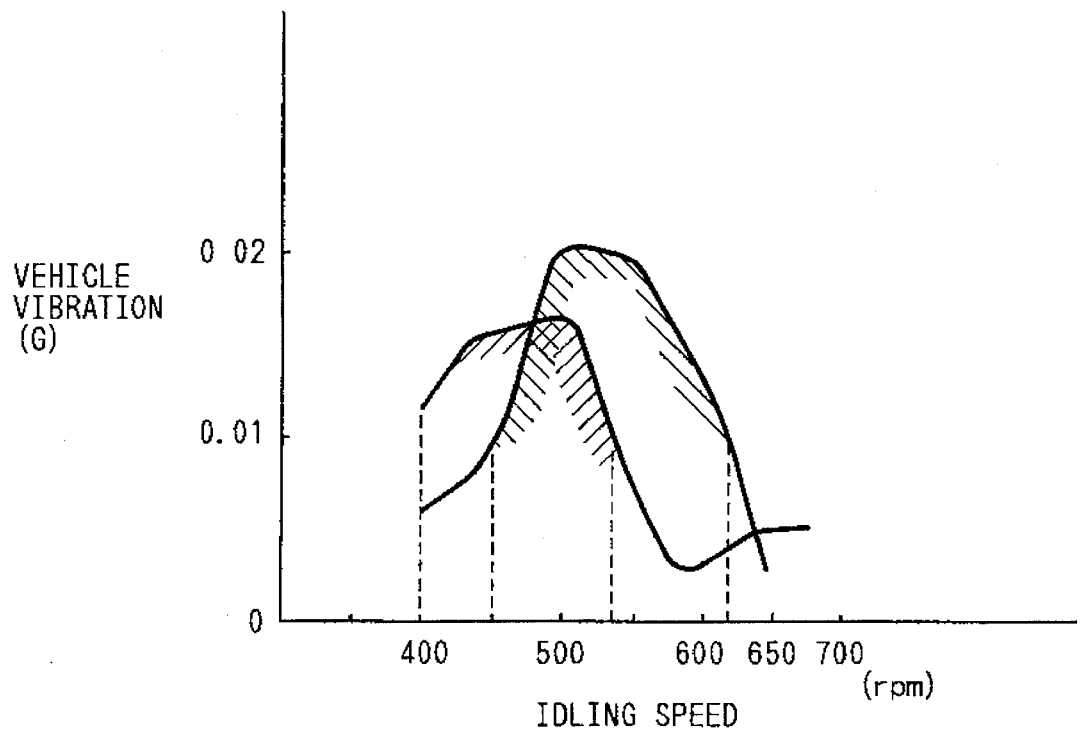
FIG. 25 is a graph which shows the relation between a vehicle vibration level and idling engine speed when vehicle weight is changed.

In a flowchart, as shown in FIG. 24, after a YES answer is obtained in step 106 concluding that the engine 1 is in idling operation, the routine then proceeds to step 500 wherein the vehicle weight is determined based on the sensor signal from the payload sensor 60.

Usually, the vehicle vibration will be changed slightly due to the variation in weight of the vehicle, causing a phase angle between the primary frequency component of the vehicle vibration and the reference crank angle to be varied. FIG. 25 shows the relation between a vehicle vibration level (i.e., amplitude) and idling engine speed. Solid lines A and B shows vehicle vibrations in different conditions of vehicle weight.

Accordingly, in this embodiment, the ROM 14 stores therein a three-dimensional table on which data indicating a preselected relation among a variation in vehicle weight, an engine speed, and a phase angle.

After step 500, the routine proceeds to step 108 wherein the phase difference $\theta$ (phase angle) is determined by look-up using the table, as mentioned above.

Subsequently, the system performs the same steps as the ones in any one of the embodiments, as mentioned previously. For example, when the vibration damping control system of this embodiment is applied to the fifth embodiment, the primary frequency component of vehicle vibration at a specific point of the vehicle body may be minimized.

Additionally, in the above control routine, for example, determination may be made if the vehicle weight detected by the payload sensor 60 is greater than a preselected threshold value. If so, the same steps 400, 410, and 420 as shown in FIG. 22 are performed. Alternatively, if the vehicle weight is smaller than the preselected threshold value, the same steps 108, 110, and 112 as shown in FIG. 4 are performed.

A fourteenth embodiment of the invention will be discussed with reference to FIG. 26, which is a modification of the vibration damping control system of the thirteenth embodiment.

The vibration damping control system of this embodiment includes a plurality of payload sensors one for each suspension of a four-wheel independent suspension system, for example. The ROM 14 stores therein first and second tables.

The first table shows mapping data for determining the center of gravity of a vehicle body which will be changed due to a variation in load due to passengers climbing in or out of the vehicle. The second table has mapping data indicating the relation among the phase difference, the center of gravity, and the weight of the vehicle body. The weight of the vehicle body may be determined by averaging values derived by each payload sensor. In addition, on the second table, the relation among the phase difference, the center of gravity, the weight of the vehicle body, and the engine speed may alternatively be mapped.

Figure 26:
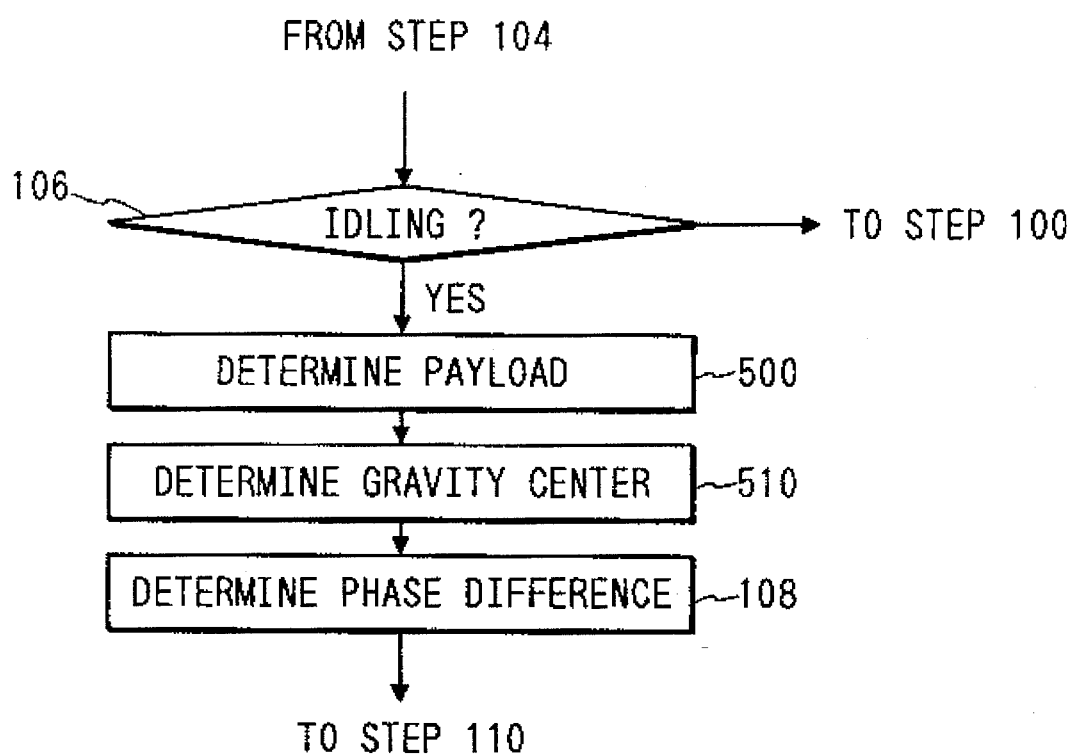
FIG. 26 is a flowchart of a program or sequence of logical steps performed by an operation mode determining device according to a modification of the vibration damping control system, as shown in FIG. 23.

In FIG. 26, after a YES answer is obtained in step 106 concluding that the engine 1 is in idling operation, the routine then proceeds to step 500 wherein the vehicle weights from all the payload sensors are detected. In step 510, the center of gravity of the vehicle body is determined by look-up using the first table, as mentioned above.

After step 510, the routine proceeds to step 108 wherein the phase difference θ (phase angle) is determined by look-up using the second table, as mentioned above.

Subsequently, the system performs the same steps as the ones in any one of the embodiments, as mentioned previously. For example, when the vibration damping control system of this embodiment is applied to the fifth embodiment, the primary frequency component of vehicle vibration at a specific point of the vehicle body may be minimized.

Figure 27:
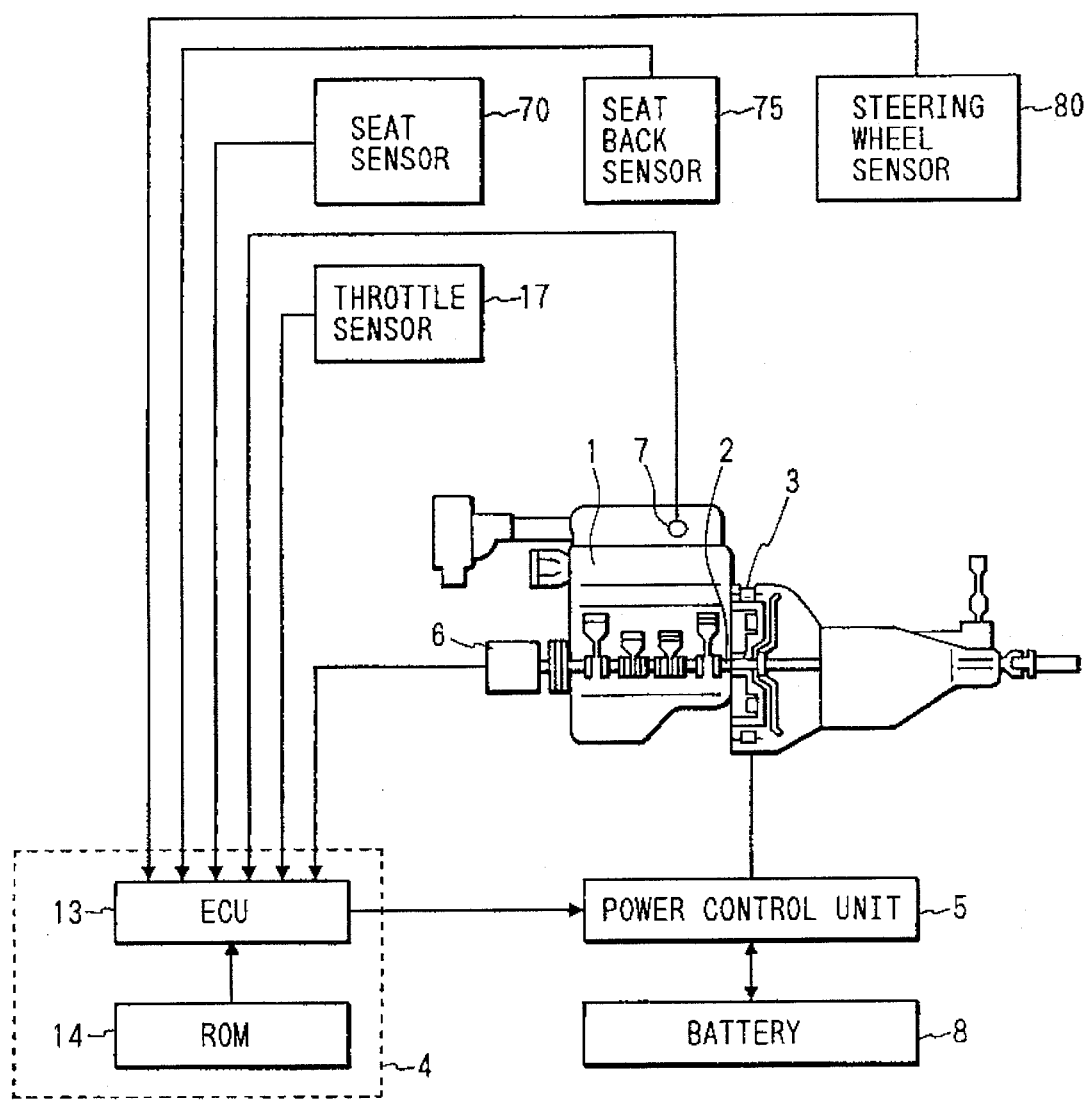
FIG. 27 is a block diagram which shows a vibration damping control system according to an alternative embodiment of the present invention.
Figure 28:
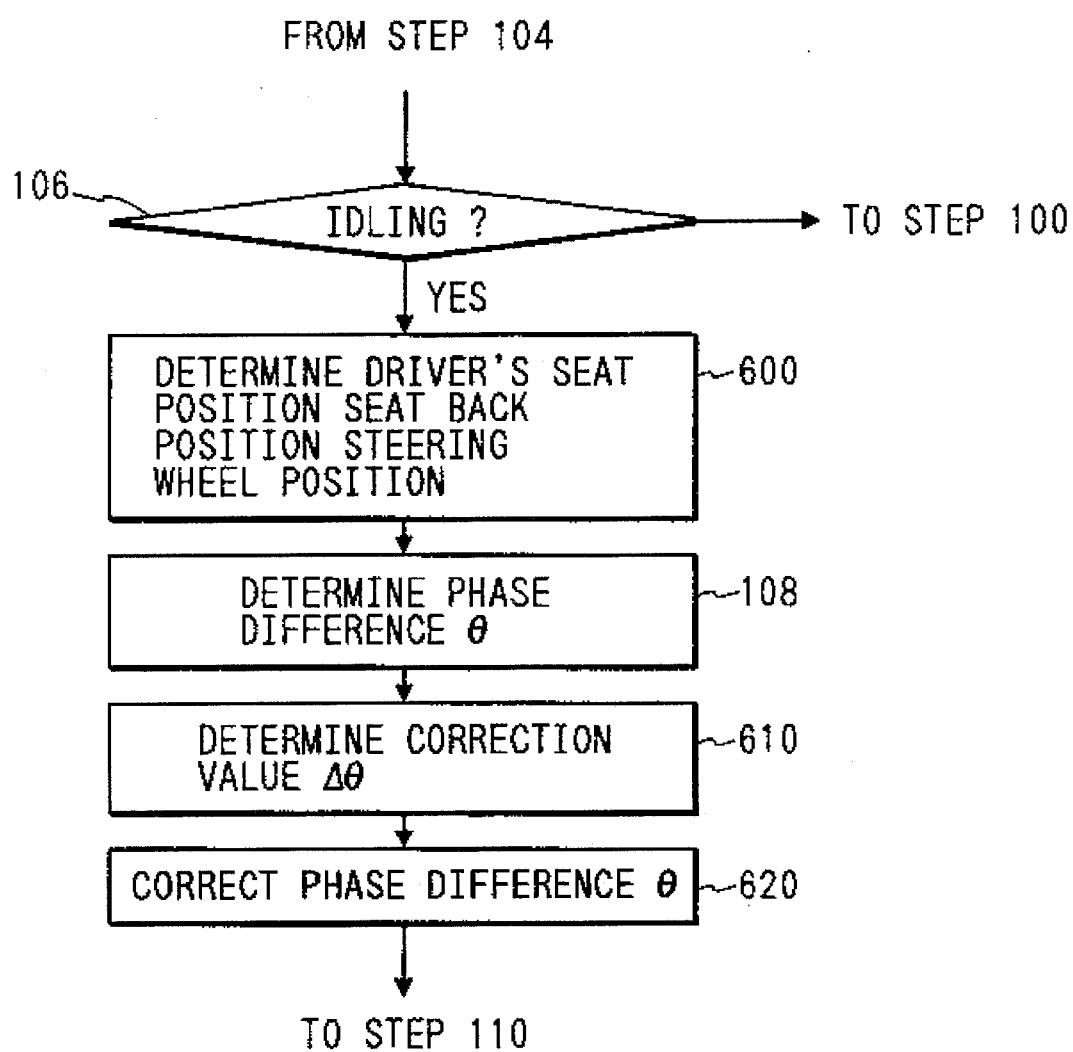
FIG. 28 is a flowchart of a program or sequence of logical steps performed by an operation mode determining device of the vibration damping control system, as shown in FIG. 27.

Referring to FIGS. 27 and 28, there is shown a vibration damping control system according to a fifteenth embodiment of the invention.

The vibration damping control system of this embodiment includes a driver's seat position sensor 70, a seat back position sensor 75, and a steering wheel position sensor 80. The driver's seat position sensor 70 detects a position of the driver's seat in a longitudinal direction of the vehicle body, and may be provided with front and rear limit switches. The front limit switch is so arranged at a preselected front position on a seat slide rail (not shown), while the rear limit switch is mounted at a given rear position thereon. When both limit switches are in OFF-state, it is concluded that the driver's seat lies in an intermediate range between the front and rear limit switches. The seat back position sensor 75 detects an inclined angle of a seat back of the driver's seat. The steering wheel angle sensor 80 detects an inclined angle of a column of a steering wheel, and may be provided with a single limit switch which is turned on when the column of the steering wheel is inclined over a given angle.

The vibration damping control system of this embodiment is designed to determine the variation in the center of gravity of a vehicle operator, or driver based on sensor signals from the driver's seat position sensor 70, the seat back position sensor 75, and the steering wheel position sensor 80. This is based on the fact that the change in the center of gravity of the driver causes the phase difference and amplitude of the primary frequency component of the vehicle vibration to be changed finely.

FIGS. 28 shows part of a flowchart of this embodiment. Steps before 600 and steps after 620 are the same as in the above third embodiment.

After a YES answer is obtained in step 106 concluding that the engine 1 is in idling operation, the routine then proceeds to 'step 600 wherein the longitudinal driver's seat position, the angular position of the seat back, and the inclined angle of the steering wheel are determined based on sensor signals from the driver's seat position sensor 70, the seat back position sensor 75, and the steering wheel position sensor 80. The routine then proceeds to step 108 wherein the phase difference θ is determined in the same manner as in step 108 in the third embodiment. Subsequently, the routine proceeds to step 610 wherein a phase difference correction value Δθ, is determined by looking up data mapped on a table representing the relation among the phase difference correction value Δθ, the longitudinal driver's seat position, the angular position of the seat back, and the inclined angle of the steering wheel. The routine then proceeds to step 620 wherein the phase difference θ derived in step 108 is shifted based on the phase difference correction value.

For example, when the drive is seated forward, a first phase difference correction value $\Delta\theta_1$ is added to the phase difference θ, while when the driver is seated rearward, a second phase difference correction value $\Delta\theta_2$ is added to the phase difference θ. When the driver is seated in the middle position, the phase difference θ is not corrected. In addition, a third phase difference correction value $\Delta\theta_3$ which is derived in a preselected relation to the angular position of the seat back is further added to the phase difference θ. Further, a fourth phase difference correction value $\Delta\theta_4$ which is derived in a preselected relation to the inclined angle of the steering wheel is also added to the phase difference θ.

It is desired that the first, second, third, and fourth phase difference correction values $\Delta\theta_1$, $\Delta\theta_2$, $\Delta\theta_3$, and $\Delta\theta_4$ be selected based on experiment data to assume optimal vibration damping effects.

Subsequently, the routine proceeds to step 110 wherein based on the phase difference corrected in step 620, the power generation-motor mode switching timing of selecting between the power generation and the motor modes in the electric generator-motor 3 is determined.

With the above phase difference correction control, vehicle vibration to which the driver is sensitive, is minimized even when the driver assume different positions.

This embodiment is, of course, applicable to any one of the above embodiments. The amplitude of the electric generator-motor 3 may be corrected based on the longitudinal driver's seat position, the angular position of the seat back, and the inclined angle of the steering wheel.

Figure 29:
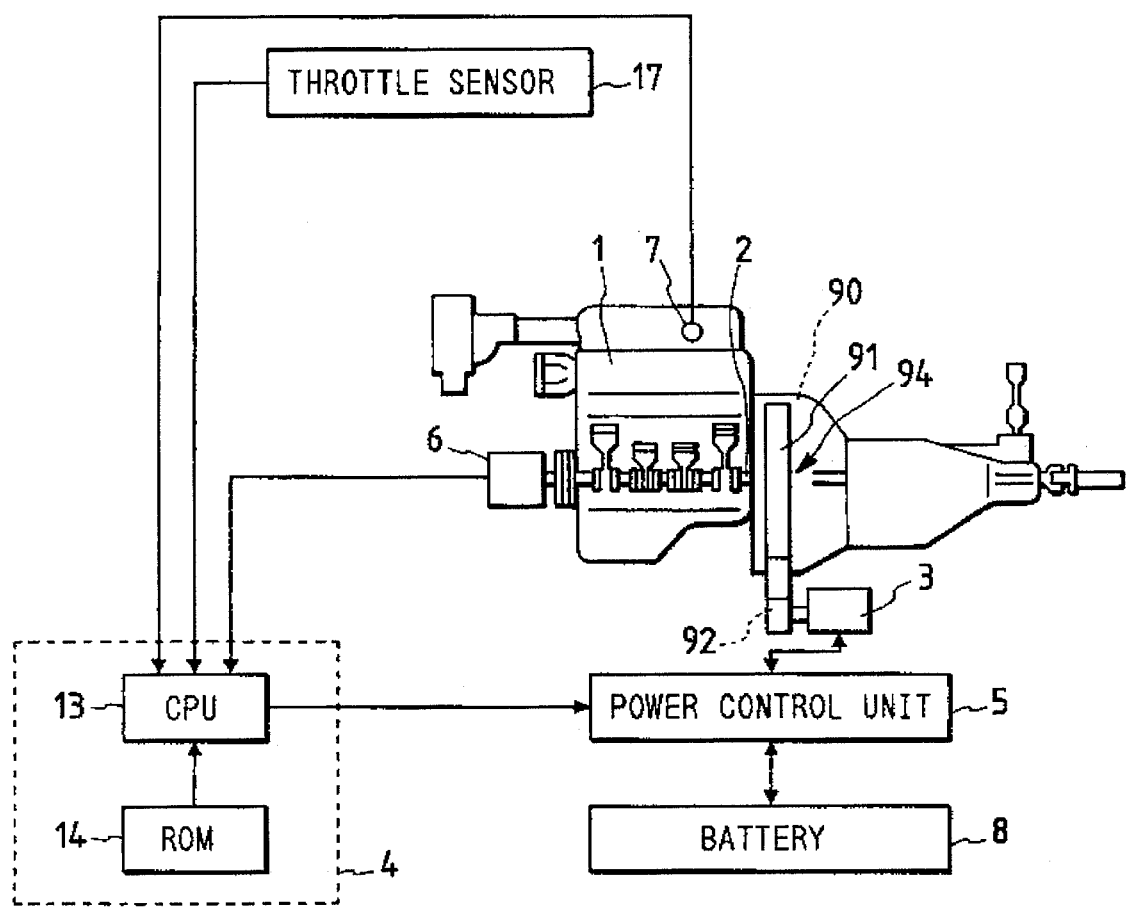
FIG. 29 is a block diagram which shows a vibration damping control system according to a sixteenth embodiment of the present invention.

Referring to FIG. 29, there is shown a vibration damping control system according to a sixteenth embodiment of the invention.

The vibration damping control system of this embodiment includes a belt type torque transmission unit 94 which establishes torque transmission between the generator-motor 3 and the crankshaft 2 of the engine 1. Other arrangements are substantially the same as those discussed in the above embodiments and explanation thereof in detail will be omitted here.

The belt type torque transmission unit 94 includes a flywheel 90 (i.e., a large pulley) connected to an end of the crankshaft 2 of the engine 1, a small pulley 92, and a belt 91 stretched between the flywheel 90 and the small pulley 92, and an idle pulley 93, as will be described later in detail. As an alternative to the belt 91, a gear train or a chain may be used.

Figure 30:
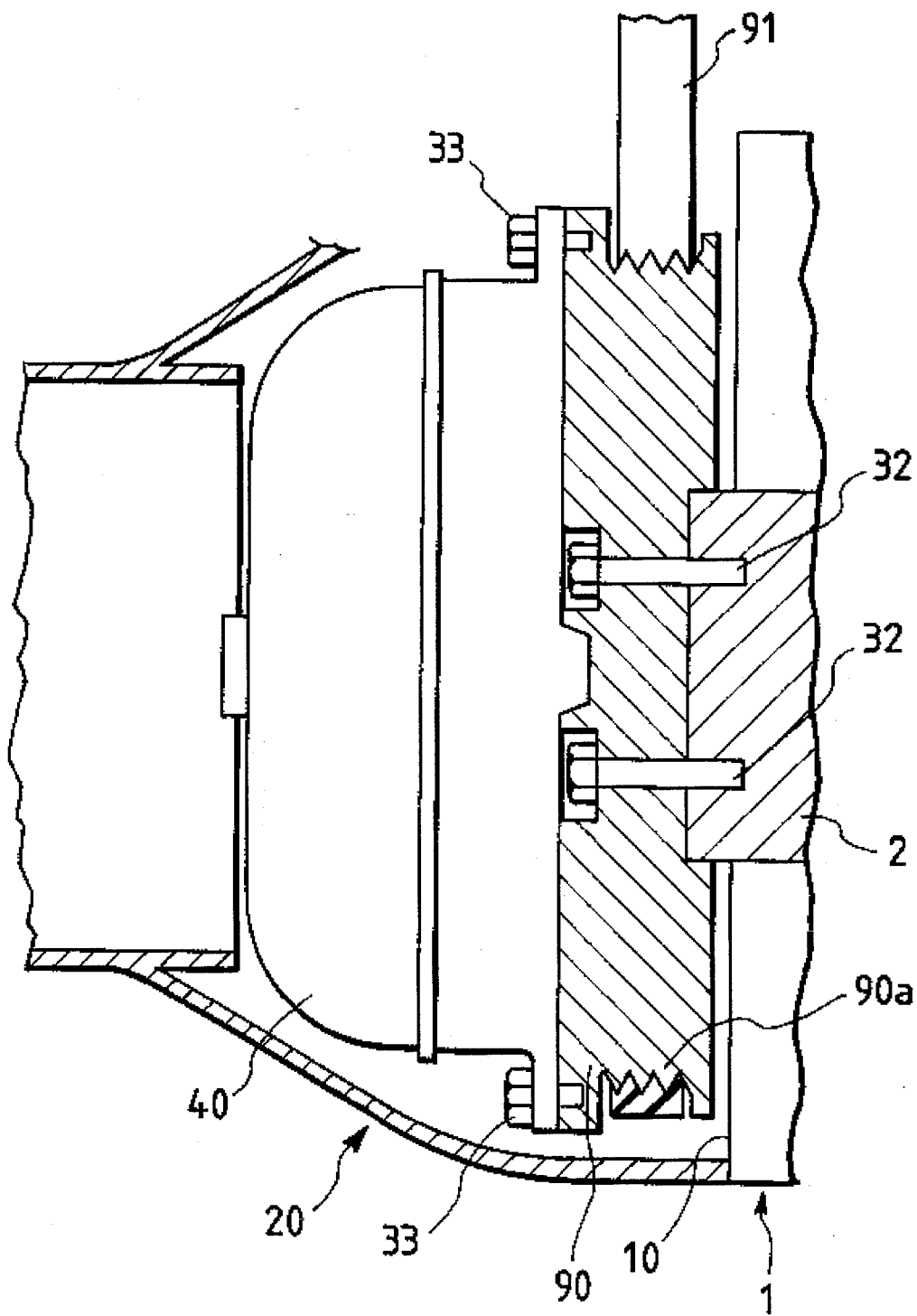
FIG. 30 is cross sectional view which shows a connection relationship between a flywheel and a crankshaft of an engine.

As clearly shown in FIG. 30, a gear casing 20 is connected at its opening end to a rear end wall 101 of the engine 1. The crankshaft 2 partially projects from the end wall 101 of the engine 1 into the gear casing 20. The flywheel 90 has a central side portion secured on a rear end of the crankshaft 2 using bolts 32, and a peripheral side portion attached to a front end wall of a torque converter 40 using bolts 33.

The flywheel 90 has formed on its periphery a belt-stretched portion, or grooves which the belt 91 engages.

Figure 31:
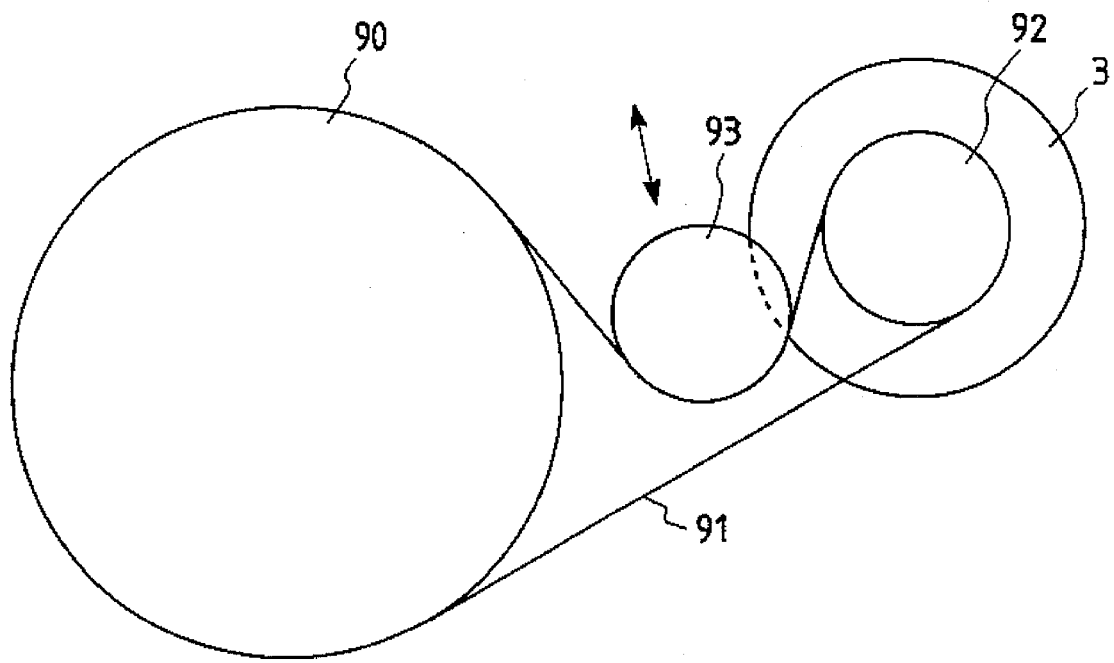
FIG. 31 is an illustration which shows an arrangement of a flywheel, a small pulley, and an idle pulley.

A support plate (not shown) extends upward, as viewed in FIG. 30, from the gear casing 20 for mounting the electric generator-motor 3. The support plate also supports a shaft of the idle pulley 93 rotatably. The belt 91 connects the flywheel 90, the small pulley 92, and the idle pulley 93. The idle pulley 93 may alternatively be supported by the support plate so that it can move in a direction indicated by an arrow shown in FIG. 31 to adjust tension of the belt 91.

Additionally, the belt 91 may be used to actuate an oil pump and a water pump. In this case, it is advisable that the generator-motor 3, the oil pump, and the water pump be coupled through a shah in tandem with each other.

Figure 32:
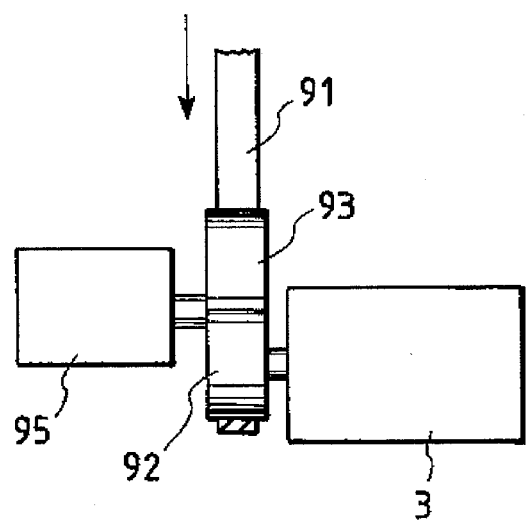
FIG. 32 is an illustration which shows an arrangement of a generator-motor and a vehicular accessory.

The idle pulley 93 may be fixed on a rotational shaft of a vehicular accessory such as the oil pump or the water pump. In this case, it is necessary to select the diameter of the idle pulley 93 according to the optimum speed of the vehicular accessory. It is desirable that the idle pulley 93 be arranged close to the small pulley 92 to increase a belt contact angle of the small pulley 92 for preventing the belt 91 from slipping although it becomes difficult to arrange the vehicular accessory connected to the idle pulley 93 and the generator-motor 3. This problem can, however, be overcome, as shown in FIG. 32, by orienting the vehicular accessory 95 and the generator-motor 3 opposite each other in their axial directions. Generally, in a conventional arrangement of parts within an engine compartment, it is difficult to mount the large pulley and the belt on the crankshaft because a radiator and its cooling fan interfere with an axially-opposed arrangement of the generator-motor and the vehicular accessory connected to the idle pulley. However, this embodiment having the flywheel 90 mounted on the rear end of the crankshaft 2 permits the above mentioned axially-oriented arrangement of the generator-motor 3 and the vehicular accessory 95, securing an effective space within an engine compartment for collective mount of various vehicular accessories. This arrangement also eliminates the need for a belt exclusively used for driving the vehicular accessory 95 for simplification of an overall device structure.

The operation mode determining device 4 includes a torque transmission lag determining means and a vibration damping command means. The torque transmission lag determining means determines a phase angle ($\theta_3$ of a torque transmission lag relative to a crank angle, i.e., the reference crank angle. The phase angle $\theta_3$ corresponds to a lag time of torque transmission through the torque transmission unit 94. The vibration damping command means issues a command to the generator-motor 3 through the power control unit 5 to generate a vibration damping torque variation for eliminating a given phase angle $\theta_4$ relative to the reference crank angle and the primary frequency component of the engine 1 having a frequency that is an multiple of the frequency of the reference crank angle. The vibration damping torque variation is controlled to have a frequency which is advanced from the reference crank angle by the sum of the phase angle $\theta_3$ and the given phase angle $\theta_4$, and equal to the frequency of the primary frequency component.

It is known that a phase angle between a primary frequency component of vehicle vibrations and a reference crank angle (i.e., a phase angle of a primary frequency component vector, as will be discussed later in detail, relative to the reference crank angle) is increased according to an increase in speed of the engine 1. This may be due to the fact that the time (i.e., delay time) during which the vibration damping torque is transmitted is constant because the sound speed is constant.

Accordingly, the operation mode determining device 4 determines the torque transmission timing, or a phase angle of a torque variation vector for reduction in the primary frequency component of the vehicle vibrations based on the engine speed. The power control unit 5 switches the power generating mode and the motor mode with the torque transmission timing determined by the operation mode determining device 4.

The primary frequency components, as explained previously with reference to FIG. 3, include the primary combustion frequency components generated by combustion operation of the engine 1. The main components of the primary combustion frequency components include a vertical vibration component of the engine caused by rectilinear movement of a rectilinear part such as a piston of the engine 1 and a rotational vibration component generated around a rotational part, or the crankshaft 2. These vibration components having the same frequency which is proportional to the frequency of a crank angle signal from the crankshaft position sensor 6, yet there is some phase angle between both the vibration components. The primary frequency components of the vehicle vibrations are, as shown in FIG. 3, represented by a resultant vibration vector 11 (i.e., the vector sum) formed of a vertical vehicle vibration component 9 caused by the vertical vibration of the engine 1 and a rotational vehicle vibration component 10 developed by the rotational vibration of the engine 1 generated around a rotational driving system such as the crankshaft 2 of the engine 1.

The rotational vehicle vibration component 10 assumes a preselected phase angle relative to the reference crank angle, or crank angle signal from the crankshaft position sensor 6. This phase angle is subjected to change according to engine speed. Similarly, the vertical vehicle vibration component 9 exhibits a preselected phase angle relative to the crank angle signal which undergoes change according to the engine speed.

It will be appreciated that the primary frequency component (resultant vibration vector) 11 of the vehicle vibration assumes a preselected phase angle relative to the crank angle signal from the crankshaft position sensor 6, which is varied according to the engine speed.

Accordingly, as explained previously, both the rotational vehicle vibration component 10 and the vertical vehicle vibration component 9 generated every combustion cycle are reduced by switching the operation mode of the electric generator-motor 3 between the power generating mode and the motor mode alternately to produce a counter torque, or vibration damping vector 15 having the same frequency as the resultant vibration vector 11 in an opposite phase thereto.

Figure 33:
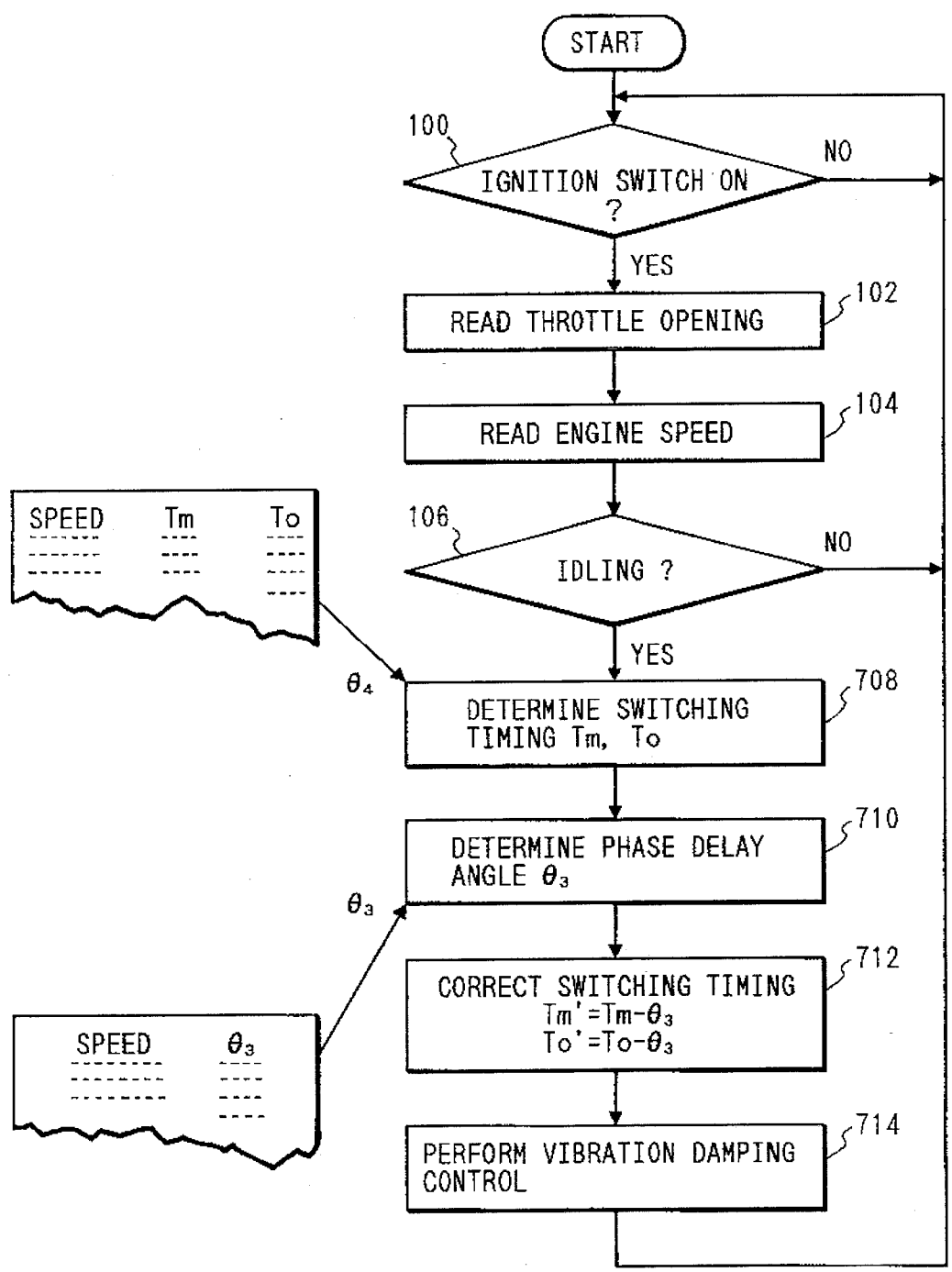
FIG. 33 is a flowchart of a program performed by an operation mode determining device of the vibration damping control system, as shown in FIG. 29.

Referring to FIG. 33, there is shown a flowchart of a program performed by the vibration damping control system of the sixteenth embodiment. Steps 101 to 106 are the same as those discussed in the above embodiments, and no attempt will be made here to describe them.

If a YES answer is obtained in step 106 meaning that the engine 1 is in an idle mode of operation, then the routine proceeds to step 708 wherein switching timing Tm from the power generating mode to the motor mode and switching timing To from the motor mode to the power generating mode are read out from a table stored in the ROM 14 based on the engine speed determined in step 104. The switching timings Tm and To are so defined as to have a vibration damping torque vector that is 180 deg. out of phase with vibrations of the engine 1 having the phase delay angle $\theta_4$, shows zero instantaneously. In other words, the switching timings Tm and To correspond to the phase delay angle $\theta_4$.

Subsequently, in step 710, the torque transmission phase delay angle $\theta_3$, as discussed above, in transmission of torque produced by the torque transmission unit 94 to the crankshaft 2 through the belt 91 is read out from a table stored in the ROM 14 based on the engine speed. The phase delay angle $\theta_3$ is, as mentioned above, developed according to torque transmission delay characteristics of the belt 91, and has a given correlation with the engine speed. The phase delay angle $\theta_3$ is expressed in time in this embodiment for ease of determination of subsequent switching timing of the generator-motor 3.

In step 712, the phase delay angle $\theta_3$ is subtracted from the switching timings Tm and To, respectively, to derive torque transmission delay-corrected timings Tm' and To' which correspond to the sum of the phase delay angles $\theta_3$ and $\theta_4$.

In step 714, the generator-motor 3 is activated with the power generation-motor mode switching timing (i.e., the timings Tm' and To') to produce a counter torque modified in phase to compensate for the torque transmission delay occurring in the torque transmission unit 94. Specifically, the operation mode determining device 4 outputs command signals to the power control unit 5 to switch the operation mode of the generator-motor 3 when the time elapsed after the reference crank angle is input periodically reaches the switching timing Tm' or To'. The generator-motor 3 is so controlled that the amount of current in the power generating mode may become equal to that consumed in the motor mode.

Note that the switching timings Tm and To and the phase delay angles $\theta_3$ and $\theta_4$ may alternatively be expressed in crank angle.

FIG. 34 shows a modification of the vibration damping control in FIG. 33.

If a YES answer is obtained in step 106 meaning that the engine 1 is in the idle mode of operation, then the routine proceeds to step 812 wherein the torque transmission delay-corrected switching timings Tm' and To' (Tm'=Tm–$\theta_3$, To'= To–$\theta_3$) are determined, and an amplitude T of torque to be generated by the generator-motor 3 is determined based on the engine speed. The torque amplitude T is derived by multiplying an amplitude Ta of vibration damping torque required to dampen vibrations of the engine 1 (Ta is a constant value in this embodiment) by a transfer gain G as a parameter of transfer function of the belt 91. The transfer gain G is changed according to a change in engine speed. The relations between the amplitude T and the engine speed, between the switching timing Tm' and the engine speed, and between the switching timing To' and the engine speed are mapped in a table stored in the ROM 14. Thus, in step 812, the switching timings Tm' and To' and the transfer gain G are derived by searching the table based on the engine speed.

Figure 35A:
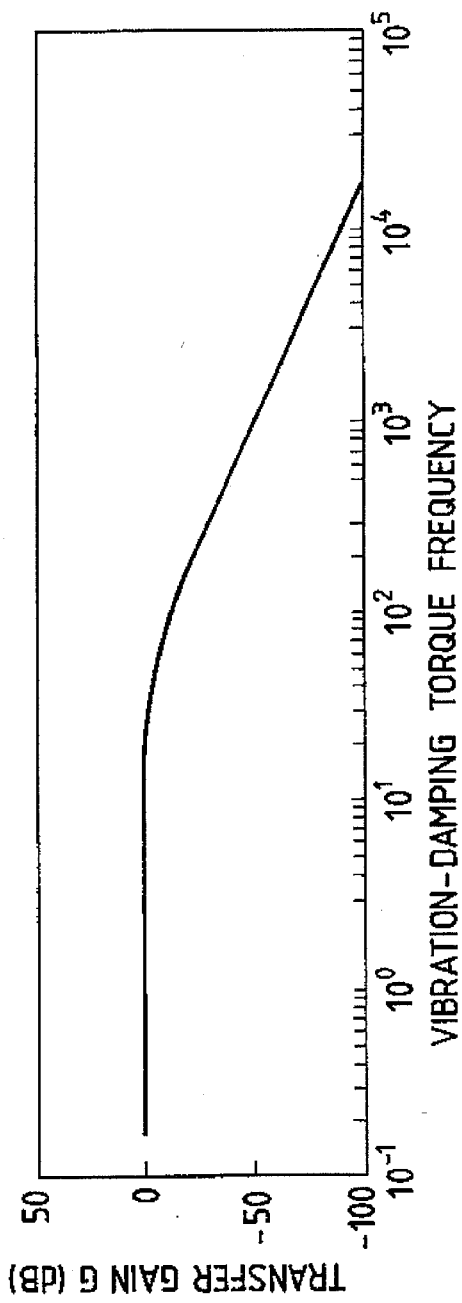
FIGS. 35(a) and 35(b) are graphs which show relations between a vibration damping torque frequency and a transfer gain G and between the vibration damping torque frequency and a phase delay angle $\theta_3$.
Figure 35B:
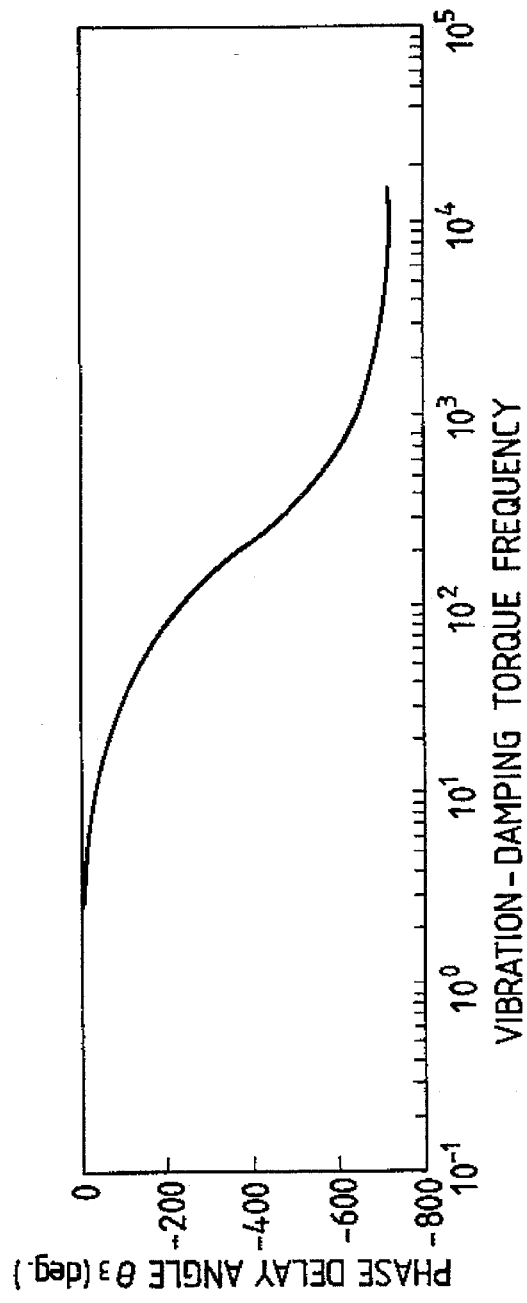

FIGS. 35(a) and 35(b) illustrate examples of relations between the transfer gain G and the engine speed (expressed in frequency of vibration damping torque here) and between the phase delay angle $\theta_3$ and the engine speed. FIG. 35(a) shows that the transfer gain G is decreased according to an increase in engine speed. FIG. 35(b) shows that the phase delay angle $\theta_3$ is increased according to an increase in engine speed.

In step 814, the generator-motor 3 is activated with the timings Tm' and To' to produce a counter torque with the amplitude T. The amplitude T can be adjusted by controlling a duty cycle of armature voltage or a duty cycle or a frequency of excitation voltage applied to the generator-motor 3. These are preferably selected according to a type of the generator-motor 3 used.

With the vibration damping control, as stated above, a variation in vibration damping torque caused by a change in the transfer gain G of the belt 91 due to a change in engine speed, is reduced.

FIG. 36 shows a second modification of the vibration damping control in FIG. 36 which compensates for a variation in vibration of the engine 1 caused by a change in opening degree of a throttle valve due to a change in temperature of the engine 1.

Steps before 812 are the same as those shown in FIGS. 33 and 34, and explanation thereof in detail will be omitted here.

After step 812, the routine proceeds to step 913 wherein a vibration damping correction parameter K for a variation in opening degree of the throttle valve is determined by look-up using a table stored in the ROM 14 based on a sensor signal from the throttle sensor 17. The table defines a relation between the vibration damping correction parameter K and the opening degree of the throttle valve. The vibration damping correction parameter K indicates a ratio of an engine vibration amplitude at a reference throttle opening angle to an engine vibration amplitude at a specific throttle opening angle, and has a positive correlation with the throttle opening angle.

In step 914, the vibration damping correction parameter K is multiplied by the amplitude T of the vibration damping torque to be generated by the generator-motor 3 to derive an amplitude T' of corrected vibration damping torque.

In step 916, the generator-motor 3 is activated with the timings Tm' and To' to produce a counter torque with the corrected amplitude T'.

Although in the above discussion, the operation of the generator-motor 3 other than the vibration damping operation is omitted, the generator-motor 3 may serve as a starter motor when starting the engine. Additionally, the capacity of the battery 8 may be measured by the battery capacity sensor 80 shown in FIG. 21 prior to the vibration damping operation during idling modes of engine operation to control the generator-motor 3 within a range which will avoid overcharge or overdischarge below a minimum available capacity of the battery 8.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A vibration damping control system for a vehicle comprising:

a rotary electric machine connected to an internal combustion engine, said rotary electric machine generating an output to damp vehicle vibrations:

crank angle detecting means for detecting a crank angle of said internal combustion engine;

engine operating condition detecting means for detecting a preselected engine operating condition;

a ROM device storing a phase difference based on a primary frequency component of vehicle vibration and said crank angle, said primary frequency component including a resultant vector defined by a rotational vibration component and a vertical vibration component, said ROM device also storing information relating said phase difference to said engine operating condition detected by said engine operating condition detecting means;

operation mode determining means for determining an operation mode of said rotary electric machine based on said engine operating condition detected by said engine operating condition detecting means and said relationship between said phase difference and said engine operating condition stored in said ROM device to reduce both said rotational vibration component and said vertical vibration component; and controlling means for controlling said rotary electric machine based on said operation mode determined by said operation mode determining means.

2. A vibration damping control system as set forth in claim 1, wherein said engine operating condition detecting means detects an idling operating condition of the internal combustion engine as the engine operating condition.

3. A vibration damping control system as set forth in claim 1, wherein said engine operating condition detecting means detects engine speed of the internal combustion engine as the engine operating condition.

4. A vibration damping control system as set forth in claim 1, wherein said engine operating condition detecting means detects engine speed and an opening degree of a throttle valve of the internal combustion engine as the engine operating condition.

5. A vibration damping control system as set forth in claim 1, wherein said rotary electric machine provides a torque variation, and said operation mode determining means determines said phase difference based on said torque variation and said crank angle of said internal combustion engine, said phase difference being required to minimize said primary frequency component of vehicle vibration for determining the operation mode of said rotary electric machine.

6. A vibration damping control system as set forth in claim 1, wherein said primary frequency component includes a frequency component at a preselected vibration-exciting portion of a vehicle body, said rotary electric machine generates a torque variation, and said operation mode determining means determines said phase difference based on said torque variation and said crank angle of said internal combustion engine, said phase difference being used to minimize said primary frequency component at said preselected vibration-exciting portion.

7. A vibration damping control system as set forth in claim 1, wherein said rotary electric machine generates a torque variation, and said operation mode determining means determines said phase difference based on said torque variation, said crank angle of said internal combustion engine and an amplitude of said torque variation, said phase difference and said amplitude being used to minimize said primary frequency component.

8. A vibration damping control system as set forth in claim 1, wherein said primary frequency component includes a primary frequency component at a preselected vibration-exciting portion of a vehicle body, said rotary electric machine generates a torque variation, and said operation mode determining means also determines said phase difference based on said torque variation, said crank angle of said internal combustion engine and an amplitude of said torque variation, said phase difference and said amplitude being used to minimize said primary frequency component and to set said operation mode of said rotary electric machine.

9. A vibration damping control system as set forth in claim 1, further comprising a torque transmission unit connecting between said internal combustion engine and said rotary electric machine to establish torque transmission between said engine and said rotary electric machine, and a torque transmission delay correction angle determining means for determining a phase delay angle of said torque transmission relative to the crank angle developed, and wherein said operation mode determining means determines the operation mode of said rotary electric machine based on said engine operating condition detected by said engine operating condition detecting means, said relationship between said phase difference and said engine operating condition stored in said ROM device, and said phase delay angle determined by said torque transmission delay correction angle determining means.

10. A vibration damping control system as set forth in claim 9, wherein said operation mode determining means determines the operation mode of said rotary electric machine to provide a torque variation to said engine which has a frequency compensating for said phase difference determined based on said engine operating condition and said phase delay angle.

11. A vibration damping control system as set forth in claim 10, further comprising throttle valve opening degree determining means for determining an opening degree of a throttle valve of said engine, wherein said operation mode determining means determines an amplitude of the torque variation to be produced by said rotary electric machine so as to compensate for an amplitude variation of the vehicle vibrations caused by a difference between the opening degree of the throttle valve determined by said throttle valve opening degree determining means and a reference opening degree of the throttle valve.

12. A vibration damping control system as set forth in claim 11, wherein said ROM device stores a relationship between a torque amplitude correction parameter and the opening degree of the throttle valve, said operation mode determining means looking up the torque amplitude correction parameter based on the opening degree of the throttle valve determined by said throttle valve opening degree determining means to determine the amplitude of the torque variation to be produced by said rotary electric machine based on the looked up torque amplitude correction parameter.

13. A vibration damping control system as set forth in claim 10, wherein said operation mode determining means further determines an amplitude of the torque variation produced by said rotary electric machine so as to compensate for a transfer gain of said torque transmission unit.

14. A vibration damping control system as set forth in claim 13, wherein said ROM device stores a relationship between said transfer gain and an engine speed, said operation mode determining means determining the amplitude of the torque variation based on said relationship between said transfer gain and the engine speed stored in said ROM device.

15. A vibration damping control system as set forth in claim 14, wherein said relationship between said transfer gain and the engine speed is defined so that said transfer gain is decreased according to an increase in the engine speed.

16. A vibration damping control system for a vehicle comprising:

a rotary electric machine connected to an internal combustion engine, said rotary electric machine generating an output to damp vehicle vibrations:

vibration detecting means for detecting a primary frequency component of vehicle vibration including a resultant vector defined by a rotational vibration component and a vertical vibration component;

a ROM device storing a plurality of operation modes of said rotary electric machine; and operation mode determining means for determining an operation mode from said operation modes stored in said ROM device based on said primary frequency component detected by said vibration detecting means; and controlling means for controlling said rotary electric machine based on said selected operation mode.

17. A vibration damping control system as set forth in claim 16, wherein said rotary electric machine generates a torque variation, and said operation mode determining means determines a phase difference based on said torque variation and a crank angle of said internal combustion engine, said phase difference being used to minimize a primary frequency component developed at a preselected vibration-exciting portion of a vehicle body, said operation mode being selected from said ROM device based on said primary frequency component detected by said vibration detecting means and the phase difference.

18. A vibration damping control system as set forth in claim 16, wherein said rotary electric machine generates a torque variation, said operation mode determining means determines an amplitude of said torque variation and a phase difference, said phase difference being determined based on said torque variation and a crank angle of said internal combustion engine, and said amplitude and said phase difference being determined to minimize said primary frequency component, and said operation mode being selected from said ROM device based on said primary frequency component detected by said vibration detecting means, said phase difference, and said amplitude.

19. A vibration damping control system as set forth in claim 16, wherein said rotary electric machine is provided with an electric generator-motor which transmits electric energy between the rotary electric machine and battery means.

20. A vibration damping control system as set forth in claim 19, wherein said controlling means switches between a power generation mode and a motor mode in said rotary electric machine with timing determined by the operation mode determined by said operation mode determining means to provide a vibration damping torque.

21. A vibration damping control system as set forth in claim 19, wherein said controlling means controls said rotary electric machine to produce or consume the electric energy within a rage from a maximum power generation level to a maximum power consumption level to provide vibration having the same frequency as the primary frequency component for reducing the rotational-vibration component and the vertical vibration component.

22. A vibration damping control system as set forth in claim 16, wherein said rotary electric machine is connected to a flywheel of the internal combustion engine for transmitting torque between the rotary electric machine and the flywheel.

23. A vibration damping control system as set forth in claim 16, wherein said rotary electric machine is provided with an alternating current motor, said controlling means controlling the amount of electric energy produced by the alternating current motor.

24. A vibration damping control system as set forth in claim 23, wherein said controlling means controls said rotary electric machine to operate within a range from maximum power generation level and a non-power generation level for providing vibration having a frequency vibrating in synchronization with the primary frequency component of the vehicle vibration.

25. A vibration damping control system as set forth in claim 16, further comprising vehicle passenger position sensor means for detecting position of a vehicle passenger occupying the vehicle, the operation mode of said rotary electric machine is corrected based on the position of the vehicle passenger.

26. A vibration damping control system as set forth in claim 16, further comprising payload sensor means for detecting weight of the vehicle, the operation mode of said rotary electric machine is corrected based on the weight of the vehicle.

27. A vibration damping control system as set forth in claim 26, wherein the payload sensor means include a plurality of payload sensors mounted on different portions of the vehicle for determining the center of gravity of the vehicle, the operation mode of said rotary electric machine being further corrected based on the center of gravity of the vehicle.

28. A vibration damping control system for a vehicle comprising:

vibration producing means, operating with a given operation timing, for generating a vibration of a preselected frequency;

phase difference determining means for determining a phase difference based on an engine revolution and a frequency of vehicle vibrations including a first vibration component caused by movement of a rotational member of an engine and a second vibration component caused by movement of a rectilinear member of the engine; and controlling means for controlling the operation timing of said vibration producing means to produce the vibration in a phase defined in a preselected relation to the phase difference determined by said phase difference determining means to compensate the vehicle vibrations.

29. A vibration damping control system as set forth in claim 28, wherein said vibration producing means generates a torque variation having the same frequency as the vehicle vibration in an opposite phase relative to a resultant vector including the first and second vibration components.

30. A vibration damping control system as set forth in claim 29, wherein said vibration producing means generates said torque variation by switching between a power generation mode and a motor mode, engine torque being transformed into electrical energy in said power generation mode, additional torque being provided to said engine in said motor mode, said controlling means controlling switching timing between the power generation mode and the motor mode to enable the vibration producing means to produce an amount of electrical energy required to power a given electric load of said vehicle.

31. A vibration damping control system as set forth in claim 30, wherein said controlling means controls the switching timing between the power generation mode and the motor mode according to a capacity of a battery mounted in the vehicle.

32. A vibration damping control system as set forth in claim 29, further comprising crank angle sensor means for determining a crank angle of the engine, said phase difference determining means determining the phase difference between the crank angle and the resultant vector including the first and second vibration components.

33. A vibration damping control system as set forth in claim 32, further comprising engine speed sensor means for determining engine speed and throttle valve position sensor means for determining an opening degree of a throttle valve, said phase difference determining means determining the phase difference between the crank angle and the resultant vector including the first and second vibration components based on the engine speed and the opening degree of the throttle valve.

34. A vibration damping control system as set forth in claim 32, further comprising engine speed sensor means for determining engine speed, said phase difference determining means determining the phase difference between the crank angle and the resultant vector including the first and second vibration components according to a variation in the engine speed.

35. A vibration damping control system as set forth in claim 32, wherein said phase difference determining means determines a phase angle between vibration of the engine and the crank angle at a location of said vibration producing means.

36. A vibration damping control system as set forth in claim 32, wherein said phase difference determining means further determines an amplitude of the resultant vector including the first and second vibration components, said controlling means controlling the operation timing of said vibration damping means to provide the vibration in the phase defined in the preselected relation to the phase difference with the amplitude determined by said phase difference determining means.

37. A vibration damping control system as set forth in claim 32, wherein said phase difference determining means determines a phase difference between the crank angle and the torque variation generated by said vibration producing means to minimize the vehicle vibration generated at a preselected portion of a vehicle body according to engine speed, said phase difference determining means further determining an amplitude of the torque variation generated by the vibration producing means to minimize the vehicle vibration generated at the preselected portion of a vehicle body based on the engine speed.

38. A vibration damping control system as set forth in claim 32, further comprising engine speed sensor means for determining engine speed, and throttle valve position sensor means for determining an opening degree of a throttle valve, where said phase difference determining means determines a phase difference between the crank angle and the torque variation produced by said vibration producing means serving to minimize the vehicle vibration according to engine speed and the opening degree of the throttle valve, and where said phase difference determining means further determines an amplitude of the torque variation produced by the vibration producing means serving to minimize the vehicle vibration based on the engine speed and the opening degree of the throttle valve.

39. A vibration damping control system as set forth in claim 32, further comprising vibration sensor means for detecting the resultant vector including the first and second vibration components, said controlling means being responsive to the resultant vector detected by said vibration sensor means to correct the operation timing of said vibration producing means determined based on the phase difference determined by said phase difference determining means to reduce the vehicle vibrations.

40. A vibration damping control system as set forth in claim 32, wherein said vibration producing means provides the torque variation assuming a phase difference relative to the crank angle which lies in a range from a first phase difference to a second phase difference, the first phase difference being defined between a first resultant vector including first and second vibration components in a maximum vibration area of the vehicle body, the second phase difference being defined between a second resultant vector including first and second vibration components in a minimum vibration area of the vehicle body.

41. A vibration damping control system as set forth in claim 40, wherein an amplitude of the torque variation produced by said vibration producing means is set to minimize the sum of an amplitude difference between the first vibration component and the first resultant vector including the first and second vibration components in the maximum vibration area and an amplitude difference between the first vibration component and the second resultant vector including the first and second vibration components in the minimum vibration area.

42. A vibration damping control system as set forth in claim 28, wherein said vibration producing means is provided with an alternator which uses part of engine torque at the given operation timing to produce electrical energy, said controlling means controlling the operation timing of the alternator to generate the vibration to the engine which is in the phase defined in the preselected relation to the phase difference determined by said phase difference determining means.

43. A vibration damping control system as set forth in claim 28, further comprising payload sensor means for detecting a variation in weight of the vehicle, the phase difference between the engine revolution and the frequency of the vehicle vibrations being corrected based on the variation in weight of the vehicle detected by said payload sensor means.

44. A vibration damping control system as set forth in claim 42, wherein the payload sensor means includes a plurality of payload sensors mounted on different portions of the vehicle for determining a center of gravity of the vehicle, the phase difference between said engine revolution and said frequency of said vehicle vibrations being further corrected based on the center of gravity of the vehicle.

45. A vibration damping control system as set forth in claim 28, further comprising vehicle passenger position sensor means for detecting position of a vehicle passenger occupying the vehicle, the phase difference between the engine revolution and the frequency of the vehicle vibrations being corrected based on the position of the vehicle passenger.

46. A vibration damping control system for a vehicle comprising:

a generator-motor connected an engine of the vehicle for applying a torque to said engine to minimize a vehicle vibration, said generator-motor working in a power generation mode and a motor mode, said generator-motor transforming engine torque into electrical energy in said power generation mode, said generator-motor providing additional torque to said engine in said motor mode;

engine revolution detecting means for detecting an engine revolution;

phase difference determining means for determining a phase difference between the engine revolution detected by said engine revolution detecting means and a frequency of the vehicle vibration, including a rotational vibration component and a linear vibration component, said vehicle vibration being produced at said engine revolution;

operation timing determining means for determining an operation timing with which said generator-motor is switched between the power generation mode and the motor mode to apply a torque variation to said engine, said operation timing being based on the phase difference determined by said phase difference determining means; and controlling means for controlling said generator-motor based on the operation timing determined by said operation timing determining means.

47. A vibration damping control system as set forth in claim 46, wherein said torque variation produced by said generator-motor is 180 deg. out of phase with the vehicle vibration, said torque variation having the same frequency as the vehicle vibration.

48. A vibration damping control system as set forth in claim 46, wherein said phase difference determining means determines the phase difference between a crank angle and a resultant vector including the rotational vibration component and the linear vibration component.

* * * * *